United States Patent
Thomas et al.

(10) Patent No.: US 12,423,615 B1
(45) Date of Patent: Sep. 23, 2025

(54) MACHINE LEARNING PIPELINES

(71) Applicant: Amazon Technologies, Inc., Seattle, WA (US)

(72) Inventors: Owen Thomas, Seattle, WA (US); Arun Babu Nagarajan, Redmond, WA (US); Kenneth O Henderson, Everett, WA (US); Weixun Wang, Kirkland, WA (US); Urvashi Chowdhary, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 17/337,320

(22) Filed: Jun. 2, 2021

Related U.S. Application Data

(60) Provisional application No. 63/118,861, filed on Nov. 27, 2020.

(51) Int. Cl.
| | |
|---|---|
| *G06N 20/00* | (2019.01) |
| *G06F 8/30* | (2018.01) |
| *G06F 18/21* | (2023.01) |
| *G06F 18/30* | (2023.01) |
| *G06F 18/40* | (2023.01) |
| *G06N 5/02* | (2023.01) |
| *G06N 5/04* | (2023.01) |

(52) U.S. Cl.
CPC .............. *G06N 20/00* (2019.01); *G06F 8/31* (2013.01); *G06F 18/21* (2023.01); *G06F 18/30* (2023.01); *G06F 18/40* (2023.01); *G06N 5/02* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 10,432,639 B1 * | 10/2019 | Bebee | G06F 16/90335 |
| 11,074,107 B1 | 7/2021 | Nandakumar | |
| 11,210,823 B1 * | 12/2021 | Simeonov | G06Q 30/0201 |
| 11,348,032 B1 * | 5/2022 | Van Gael | G06F 8/31 |
| 11,676,072 B1 * | 6/2023 | Chandrasekharan | G06F 18/23 706/12 |
| 11,748,634 B1 * | 9/2023 | Kulkarni | G06F 18/21 707/722 |
| 2017/0017903 A1 | 1/2017 | Gray et al. | |
| 2020/0348912 A1 * | 11/2020 | Katzenberger | G06F 12/0207 |
| 2020/0348969 A1 * | 11/2020 | Grossman | G06F 16/9024 |

(Continued)

OTHER PUBLICATIONS

USPTO Office Action dated Apr. 21, 2025 in U.S. Appl. No. 17/337,334, 63 pages.

(Continued)

*Primary Examiner* — Ryan Barrett
(74) *Attorney, Agent, or Firm* — Davis Wright Tremaine LLP

(57) ABSTRACT

Techniques described herein may be implemented in the context of a computing resource service provider. A machine learning (ML) service provides an interface to clients which can be used to create, read, update, and delete ML pipelines. ML pipelines can be converted to a human-readable format, which a server persists. Clients of a machine learning service can start, stop, and resume executions a ML pipeline based on the human-readable format of the ML pipeline.

20 Claims, 16 Drawing Sheets

(56) References Cited

U.S. PATENT DOCUMENTS

| | | | |
|---|---|---|---|
| 2021/0064433 A1* | 3/2021 | Nakfour | G06F 9/5027 |
| 2021/0065040 A1* | 3/2021 | Eberlein | G06F 9/451 |
| 2021/0065048 A1* | 3/2021 | Salonidis | G06N 20/00 |
| 2021/0089961 A1* | 3/2021 | Zeise | G06N 20/00 |
| 2021/0151191 A1* | 5/2021 | Fornwalt | A61B 8/5223 |
| 2021/0201128 A1* | 7/2021 | Xu | G06N 3/08 |
| 2021/0312324 A1* | 10/2021 | Huang | G06F 18/2178 |
| 2021/0326736 A1* | 10/2021 | Kishimoto | G06F 18/217 |
| 2022/0004914 A1* | 1/2022 | Kirchner | G06F 8/76 |
| 2022/0067576 A1* | 3/2022 | Saha | G06F 16/24573 |
| 2022/0092470 A1* | 3/2022 | Jaeger | G06N 20/00 |
| 2022/0206774 A1* | 6/2022 | Arora | G06F 8/34 |
| 2023/0075295 A1* | 3/2023 | Saha | G06N 5/01 |
| 2023/0409464 A1* | 12/2023 | Sharma | G06F 21/552 |

OTHER PUBLICATIONS

USPTO Office Action dated Dec. 30, 2024 in U.S. Appl. No. 17/337,334, 57 pages.

\* cited by examiner

```
Data Preparation
Operation 300
```

```python
%%writefile abalone/preprocessing.py
import argparse; os; requests; tempfile; numpy as np; pandas as pd from sklearn.compose import ColumnTransformer; sklearn.impute import
SimpleImputer; from sklearn.pipeline import Pipeline; from sklearn.preprocessing
import StandardScaler, OneHotEncoder feature_columns_names = ["sex", "length", "diameter", "height", "whole_weight",
"shucked_weight", "viscera_weight", "shell_weight",]
label_column = "rings"

feature_columns_dtype = { "sex": str, "length": np.float64, "diameter": np.float64,
"height": np.float64, "whole_weight": np.float64, "shucked_weight": np.float64,
"viscera_weight": np.float64, "shell_weight": np.float64
}
label_column_dtype = {"rings": np.float64} def merge_two_dicts(x, y):
    z = x.copy()
    z.update(y)
    return z if __name__ == "__main__":
    base_dir = "/opt/ml/processing"

df = pd.read_csv(
        f"{base_dir}/input/abalone-dataset.csv",
        header=None,
        names=feature_columns_names + [label_column],
        dtype=merge_two_dicts(feature_columns_dtype, label_column_dtype)
    )
    numeric_features = list(feature_columns_names)
    numeric_features.remove("sex")
    numeric_transformer = Pipeline(
        steps=[
            ("imputer", SimpleImputer(strategy="median")),
            ("scaler", StandardScaler())
        ]
    )
```

FIG. 3

```
                    ┌──────────────────┐
                    │ Data Preparation │
                    │  Operation 300   │
                    └──────────────────┘

)
    categorical_features = ["sex"]
    categorical_transformer = Pipeline(
       steps=[
           ("imputer", SimpleImputer(strategy="constant",
fill_value="missing")),
           ("onehot", OneHotEncoder(handle_unknown="ignore"))
       ]
    )

preprocess = ColumnTransformer(
       transformers=[
           ("num", numeric_transformer, numeric_features),
           ("cat", categorical_transformer, categorical_features)
       ]
    )

y = df.pop("rings")
    X_pre = preprocess.fit_transform(df)
    y_pre = y.to_numpy().reshape(len(y), 1)

X = np.concatenate((y_pre, X_pre), axis=1)

np.random.shuffle(X)
    train, validation, test = np.split(X, [int(.7*len(X)), int(.85*len(X))])

pd.DataFrame(train).to_csv(f"{base_dir}/train/train.csv", header=False,
index=False)
    pd.DataFrame(validation).to_csv(f"{base_dir}/validation/validation.csv",
header=False, index=False)
    pd.DataFrame(test).to_csv(f"{base_dir}/test/test.csv", header=False,
index=False)
```

FIG. 4

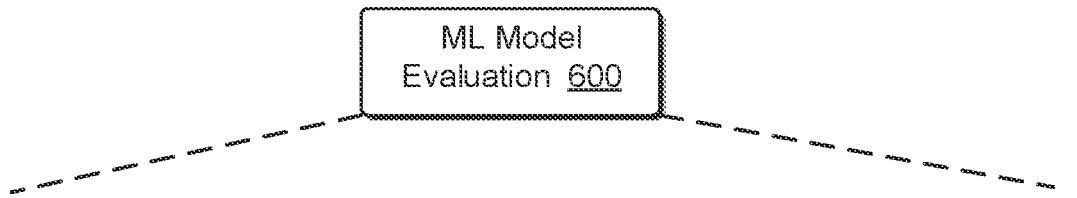

```
                    ┌─────────────┐
                    │  ML Model   │
                    │Evaluation 600│
                    └─────────────┘ evaluation_report = PropertyFile(
    name="EvaluationReport",
    output_name="evaluation",
    path="evaluation.json"
)
step_eval = ProcessingStep(
    name="AbaloneEval",
    processor=script_eval,
    inputs=[
        ProcessingInput(
            source=step_train.properties.ModelArtifacts.S3ModelArtifacts,
            destination="/opt/ml/processing/model"
        ),
        ProcessingInput(
            source=step_process.properties.ProcessingOutputConfig.Outputs[
                "test"
            ].S3Output.S3Uri,
            destination="/opt/ml/processing/test"
        )
    ],
    outputs=[
        ProcessingOutput(output_name="evaluation", source="/opt/ml/processing/evaluation"),
    ],
    code="abalone/evaluation.py",
    property_files=[evaluation_report],
)
```

FIG. 6

MACHINE LEARNING PIPELINES

CROSS-REFERENCE TO RELATED APPLICATIONS

This application claims the benefit of U.S. Provisional Patent Application No. 63/118,861, filed Nov. 27, 2020, entitled "MACHINE LEARNING DATA TRANSFORMATION PIPELINES," the disclosure of which is incorporated herein by reference in its entirety. This application also incorporates by reference for all purposes the full disclosure of U.S. patent application Ser. No. 17,337,334, filed concurrently herewith, entitled "MACHINE LEARNING PIPELINES."

BACKGROUND

Building a machine learning (ML) model may be challenging and involve a multi-step process. It may be challenging for model builders to manage the end-to-end ML workflows, which may involve many hurdles to end-to-end development that may hinder the accuracy and reliability of ML models. It may be difficult to implement rigorous continuous integration and continuous deployment (CI/CD) processes to ML deployments.

BRIEF DESCRIPTION OF THE DRAWINGS

Various techniques will be described with reference to the drawings, in which:

FIG. 3 illustrates an exemplary operation definition related to data preparation operations, according to at least one embodiment;

FIG. 4 illustrates a continuation of the exemplary operation definition related to the data preparation operations, according to at least one embodiment;

FIG. 6 illustrates an exemplary operation definition related to evaluating a trained ML model, according to at least one embodiment;

DETAILED DESCRIPTION

Figure 1:
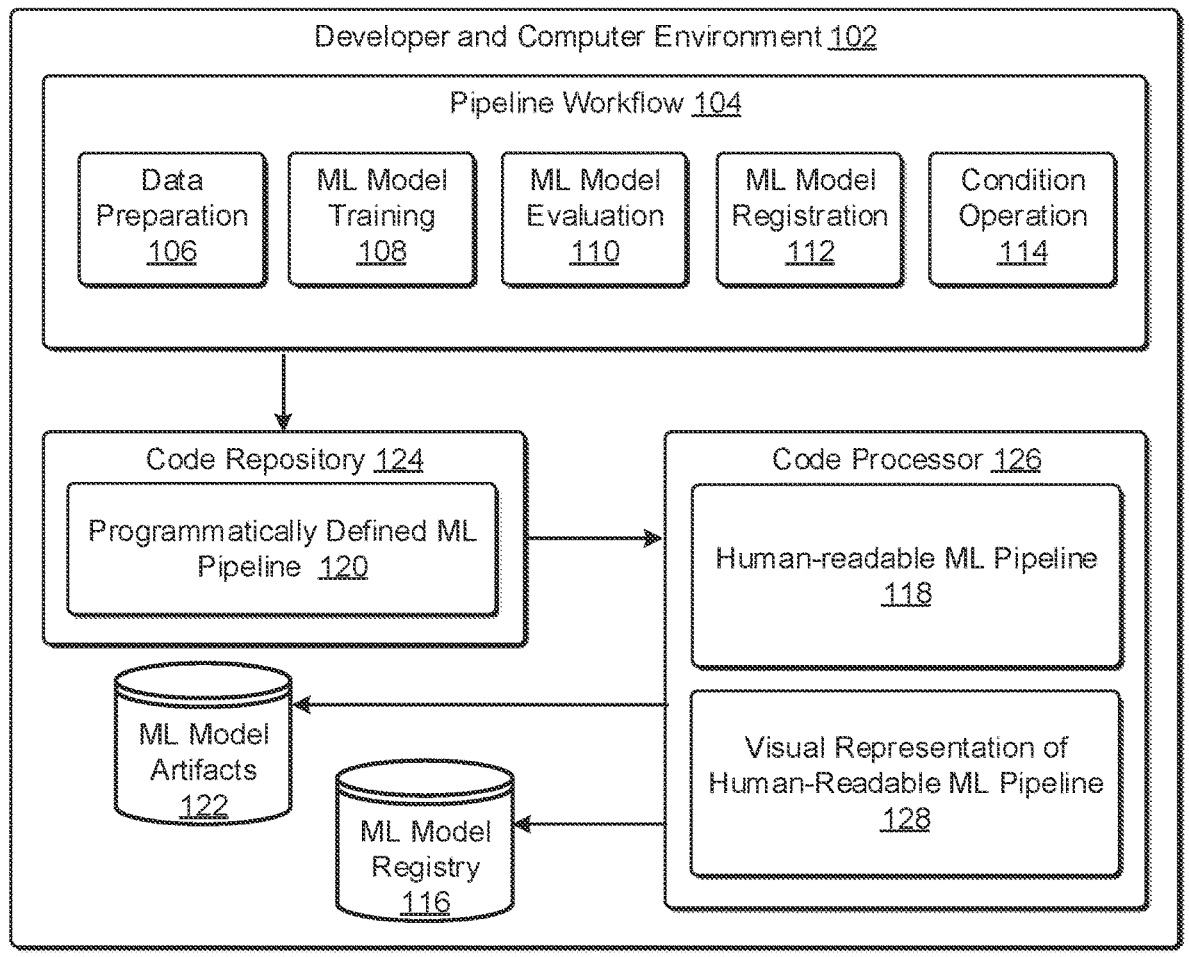
FIG. 1 illustrates a computing environment in which a machine learning (ML) pipeline workflow can be generated and processed to provide an ML model, according to at least one embodiment.

Systems and methods described herein may be utilized to implement a service for creating, generating, and orchestrating machine learning (ML) pipelines. An ML pipeline may act on data from various sources and data scientists can create ML pipelines using a programming language that is compiled or converted into a human-readable representation that is submitted to an endpoint, such as a customer's endpoint or an endpoint of a service provider that offers a service to create ML pipelines and/or use ML pipelines.

ML pipelines may be stored in a computing resource(s) of a service provider, and data scientists can schedule runs of these pipelines. In various examples, capabilities for orchestrating ML pipelines are integrated into an integrated development environment (IDE) for ML that allows users to easily author ML pipelines and workflows of those ML pipelines, schedule runs, and inspect ML pipeline results and artifacts directly within the IDE. The IDE for ML can offer pre-authored ML pipeline templates that uses can use as a basis for authoring ML pipelines and associated workflows.

A data scientist can create an ML pipeline within the IDE. The IDE can include a continuous integration and continuous deployment (CI/CD) environment. The ML pipeline can be created or generated using a programming language. The programming language can be associated with high-level software programming software development kit (SDK) such as a Python SDK, or another similar development SDK. The ML pipeline can be saved as a file or other data structure in the format of the programming language. The data structure including the ML pipeline can be communicated to a code repository. This code repository can be a computer storage allocated to the data scientist as part of the process of creating the ML pipeline.

Storing the ML pipeline in the code repository can trigger converting or compiling the ML pipeline based on a programming syntax that is different than the programming syntax used to generate the ML pipeline. The programming syntax can convert or compile the ML pipeline to generate another representation of the ML pipeline. The conversion or compilation of the ML pipeline can express the ML pipeline in human-readable format. In an example, the conversion or compilation of the ML pipeline expresses the ML pipeline based on a data interchange format. The conversion or compilation of the pipeline can express the ML pipeline using Java Script Object Notation (JSON) or YAML.

Converting or compiling the ML pipeline, based on the programming syntax that is different than the programming syntax used to generate the ML pipeline, can generate a visual representation of the ML pipeline. In an example, the visual representation of the ML pipeline is expressed as a directed acrylic graph (DAG) or other graph structure. The visual representation of the ML pipeline can include one or more nodes. In an example, the visual representation of the ML pipeline can include a plurality of interconnected nodes. The interconnected nodes can correspond to vertices of a graph. The connecting elements of the interconnected nodes can be edges of the graph. The edges of the graph can represent dependencies between respectively connected nodes or vertices. The nodes of the graph can corresponded to ML operations, in some instances defined as programmatic classes, in the ML pipeline stored in the code repository.

The ML pipeline generated by a user based on the high-level programming language, such as Python, can include one or more objects. Each of the one or more objects can correspond to an operation, also referred to herein as a step, in a workflow of the ML pipeline. In an example, the ML pipeline in the high-level programming language includes a plurality of objects each corresponding to an operation in the workflow of the ML pipeline. For example, a first object can correspond to a data validation operation, a second object can correspond to a data preparation operation, a third object can correspond to an ML model training operation, a fourth object can correspond to evaluation and/or validation of the trained ML model, and a fifth object can correspond to registering the ML model in a model registry, such as a computer storage or database.

A user can use the IDE to store the high-level programming language version of the ML pipeline in a code repository allocated to the user. The IDE can automatically, or manually based on user interaction, generate the human-readable format of the programmatically generated ML pipeline. The human-readable format of the ML pipeline can be stored in a data structure or file appropriate to the syntax type of the ML pipeline expressed in human-readable format.

The human-readable format of the ML pipeline can be expressed visually. For example, each step or operation included in the human-readable format of the ML pipeline can be associated with a node of a visual representation derived from the human-readable format of the ML pipeline. The visual representation can be a graph that includes nodes. The nodes can be interconnected. In an example, the visual representation is a graph that includes nodes, where each node corresponds to a step or operation of the human-readable format of the ML pipeline. The nodes can be vertices of the graph. The nodes can include underlying data. The underlying data can indicate one or more locations of data, such as test datasets, validation datasets, and training datasets. In addition, the underlying data can indicate performance data. In an example, the data associated with a training operation can include metrics data corresponding to training an ML model and/or validating an ML model. In another example, the data associated with an ML model registration operation can correspond to a location the ML model is stored. The data can also correspond to versioning information of the ML model, which can be stored in a database or a computer storage location that stores ML models.

Historical data or lineage data can be generated and stored as part of the process of generating an ML pipeline that includes a workflow that can generate an ML model. The lineage data can include data associated with generating the ML pipeline in accordance with the high-level programming language. Furthermore, the lineage data can include data associated converting the ML pipeline based on the high-level programming language to a version of the ML pipeline in a human-readable language. In the example, the lineage data generated and stored can include temporal data indicating when the ML pipeline in accordance with the high-level programming language was created. Furthermore, the lineage data can include when the programmatically generated ML pipeline was last modified and can include user information associated with the user that modified the ML pipeline. In an example, the same type of historical data is maintained for the ML pipeline after is converted into the human-readable format. The historical data or lineage data can also include identifiers for computer storage locations hosting some or more of the data associated with various versions of the ML pipelines. These computer storage locations can host ML training, validation, evaluation, and other datasets associated with an ML pipeline workflow and/or an ML model.

The advantages provided by one or more of the described embodiments are numerous. For example, an ML pipeline workflow generated according to one or more of the described embodiments improves compute resource usage, including use of one or more processors and computer storage, by reducing an amount of time, conventionally required by data scientists and developers, needed to develop the ML pipeline workflow using one or more computing devices. In addition, ML pipeline workflow lineage data generated by one or more of the described embodiments allows data scientists and other stakeholders to quickly identify datasets, ML models, ML pipeline workflows, and so forth, thereby increasing compute capacity efficiencies and the availability of computing capabilities for other uses. Furthermore, expressing one or more ML pipeline workflows in human-readable format improves debugging and deployment of those ML pipeline workflows, directly improving efficient use of underlying computing resources. In at least some embodiments, one or more data sources are identified to store datasets that are used in generating ML models based on one or more ML pipeline workflows. These one or more data sources improve data source utilization by generally reducing a number of disparate data sources storing data referenced by the ML pipeline workflows.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a computing environment 100 in which an ML pipeline workflow can be generated and processed to provide an ML model, according to at least one embodiment. The computing environment 100 can include one or more computing devices, such as computing servers, that comprise one or more processors that communicate with one or more computer storages. The one or more processors and can execute computer-executable instructions stored in the one or more computer storages to allow for the instantiation and the realization of the computing environment 100 that includes the ML pipeline workflow and/or the ML model. The computing environment 100 can include a plurality of ML pipeline workflows and ML models.

According to an embodiment, the computing environment 100 can include a developer and computer environment 102. The developer and computer environment 102 can include a development interface, such as a CI/CD environment, that can be used by one or more users to develop ML pipeline workflows. The developer and computer environment 102, as described in greater detail in the following, includes various infrastructure for generating and ML pipeline workflows and subsequently converting or compiling those ML pipeline workflows from a programmatic structure according to a first programming syntax to data format based on a second programming syntax. In at least one embodiment, the first programming syntax is associated with a high-level programming language, such as Python, Java, JavaScript, Perl, Smalltalk, C++, Haskell, PHP, Ruby, Scala, R Language, and the like. In at least one embodiment, the second programming syntax is associated with a data structuring technique or methodology, such as a data interchange format syntax, such as JavaScript Object Notation (JSON), XML, YAML, BSON, MessagePack, HCL, and the like.

A user can use the developer and computer environment 102 to create a pipeline workflow 104. In an embodiment, the pipeline workflow 104 is an ML pipeline workflow 104, often referred to herein as simply an ML pipeline. The ML pipeline 104 can be created using a programming language, to thereby provide a programmatically defined workflow structure. In an embodiment, the programming language provides a first representation of the ML pipeline 104. In yet another embodiment, the programming language provides a programmatic structure of the ML pipeline 104. In at least one embodiment, the developer and computer environment 102 comprises one or more templates that can be used to generate the ML pipeline workflow 104. For example, there can be a template for creating an ML pipeline that deploys a model. There can also be a template for creating an ML pipeline that trains model. In addition, in at least one embodiment, there is a template for creating an ML pipeline that trains a model and deploys the model. Each of the templates can provide pre-generated computer code that can be modified by a user that will code and debug a prepared ML pipeline.

The pipeline workflow 104 can comprise one or more operations. In an embodiment, these operations are each expressed as objects or classes defined by the syntax of programming language. In an example, the objects or classes are Python objects or classes. In general, the pipeline workflow 104 comprises one or more operations to be executed to generate an ML model. This ML model can be pushed to an endpoint, such as a customer endpoint of an online service provider. The ML model can be used by the endpoint to perform one or more ML jobs or processes.

In an embodiment, the pipeline workflow 104 includes five operations or steps defined according to a programming language, such as Python. As illustrated in FIG. 1, the operations can include a data preparation operation 106, an ML model training operation 108, an ML model evaluation operation 110, and an ML model registration operation 112. In addition, in an embodiment, the operations of the pipeline were for 104 can include a condition operation 114. Each one of the operations of the pipeline workflow 104 are summarized in the following. The pipeline workflow 104 can include a greater number of operations or fewer operations than as illustrated in FIG. 1. Moreover, some or more of the operations illustrated in the pipeline workflow 104 can be combined together. In general, the pipeline workflow 104 can include one or more ML operations that perform pre-processing, data preparation, training, evaluation, model creation, batch transformation, condition testing, and model registration.

One or more datasets can be generated as part of the data preparation operation 106. The data preparation operation 106 can upload data used during the pipeline workflow 104 to a storage location, such as a local storage or a remote storage, or a combination of the two.

With respect to storage mechanisms, which can be used to store some or all of the data, operations, and so forth, described herein, an example of a storage mechanism type includes at least a portion of a non-volatile storage device for a computer system, such as a portion of the storage device that may optionally be dedicated for use as a storage cache for a particular software program executing on a computer system and/or for a particular user of one or more software programs executing on the computer system. A storage mechanism type that may a distributed file system that is provided in part by the computer system and in part by one or more other associated computer systems. Non-exclusive examples of distributed file systems that may be used include the following: GlusterFS, AFS (Andrew File System), NFS (Network File System), Dfs (Distributed File System), GFS (Google File System), HDFS (Hadoop Distributed File System), etc. In some embodiments, other types of storage mechanism types local include a virtual local block storage device whose data is stored at least in part on one or more remote systems, whether instead of or in addition to local storage mechanisms. In addition, such a local storage device may be permanently attached to a computer system (e.g., a hard disk internal to the target computer system) and/or temporarily attached to the computer system (e.g., a USB-based flash key or drive, a portable external hard disk, a magnetic tape that may be used in a tape drive of the target computer system, etc.).

Another storage mechanism can include a remote online storage service provided by one or more systems that are separated by one or more intervening networks. Such online storage services may be of different types and provide different types of capabilities, such as a first online storage service that provides long-term storage for object data, a second online storage service that provides in-memory cache data in a distributed manner over multiple systems, a third online storage service that provides long-term storage for database data, a fourth online storage service that provides long-term block data storage, etc. Non-exclusive examples of online storage services that may be used include the following: Amazon Simple Storage Service (S3) that stores object data of various types; Amazon ElastiCache that provides an in-memory cloud-based cache; an online storage service using the memcached distributed memory caching system; Amazon Elastic Block Store (EBS) that provides access to raw block storage devices, including to enable mounting a virtual local block storage device on a target computer system; Amazon SimpleDB that provides functionality to store key-value pairs; Amazon Relational Database Service (RDS) that provides relational database functionality; etc. In some embodiments, other types of storage mechanism may be used, whether instead of or in addition to storage mechanisms of the types discussed herein, including a remote database, a storage area network, one or more remote network storage devices, a storage system (e.g., a RAID-based system), etc.

In an embodiment, the data preparation operation 106 can include uploading a number of datasets to computer storage. At least one of the datasets can be used for batch transformation once an ML model is created. The data preparation operation 106 can also include identifying parameters to parameterize the ML pipeline 104 during execution. The ML pipeline 104 can support various parameter types, such as programmatic strings, programmatic integers, and programmatic floats. In an embodiment, the parameters associated with the ML workflow 104 include an instance type parameter, and instant type count parameter, as well as parameters for the data used by the ML workflow 104. The uploading process of datasets performed by the data preparation operation 106 can also include storing data used to accumulate lineage data or historical data that tracks the versions of the datasets used to train an ML model.

The data preparation operation 106 can include a programmatic script that implements feature engineering. In at least one embodiment, the programmatic script for feature engineering can compensate for missing data, such as category data, in any one or more datasets used for ML model training. The programmatic script can also scale and normalize numerical fields in the one or more datasets. Furthermore, the programmatic script can process data to generate separate datasets for training, validation, and testing associated with an ML model. Thus, the data preparation operation 106, in at least one embodiment, can execute the script on the input data. A training operation can use the preprocessed training features and labels to train an ML model. An evaluation operation uses the trained ML model and preprocessed test features and labels to evaluate the ML model.

The ML model training operation 108 can train an ML model based on the data associated with the data preparation operation 106. The ML model training operation 108 can include a script that loads data from input channels, configures training with hyperparameters, trains a model, and saves a model to a storage location. An estimator instance can construct the training operation as well as the properties of the prior data preparation operation 106 used as input in the ML model training operation 108 inputs, and the code that is executed when the pipeline workflow 104 invokes the pipeline execution. In at least one embodiment, an estimator fit method in the Python SDK can be used.

In an embodiment, the ML model training operation 108 can retrieve a training dataset from a storage location. The ML model training operation 108 can also retrieve a test dataset from a storage location. These storage locations can be located based on the data preparation operation 106. The ML model training operation 108 generates a trained ML model based on one or more datasets generated by the data preparation operation 106. In an embodiment, the training operation 108 generates data that identifies a version of the trained ML model. Furthermore, the training operation 108 can generate data that identifies version information of the datasets used to train the ML model. The data identifying the version of the trained ML model can identify the name of the trained ML model, the date and time, such as temporal data, that the trained ML model was generated, as well as a user that caused the model to be trained. Version data for the trained ML model as well as the version data for the datasets used to trained ML model can be stored as searchable lineage data. Specifically, the lineage data can be stored in a searchable database. In some embodiments, the lineage data is stored for a plurality of trained ML models.

The ML pipeline workflow 104 can comprise an ML model evaluation operation 110. The ML model evaluation operation 110 is to evaluate the trained ML model generated by the ML model training operation 108. In at least one embodiment, the ML model evaluation operation 110 generates evaluation data that can be analyzed by a user. In at least one embodiment, the evaluation data can be analyzed by converting the evaluation data to a JSON representation. In at least one embodiment, the ML model evaluation operation 110 implements an XGBoost evaluation script to evaluate the trained ML model generated by the ML model training operation 108. For example the XGBoost evaluation script can be based the XGBoost script provided by Python. In at least one embodiment, the evaluation data can be assigned versioning information related to its use to evaluate a particular ML model. This version information can be stored in a searchable manner as lineage data associated with the ML model. In an embodiment, a user can search the lineage data to identify the evaluation data that was used to evaluate one or more ML models.

The ML model evaluation operation 110 can perform the following described functions. The operation 110 can load the trained ML model provided by the ML model training operation 108. The ML model evaluation operation 110 can use a test dataset, such as the test dataset generated by the data preparation operation 106, to issue predictions against the test dataset based on the trained ML model. The ML model evaluation operation 110 can also build a classification report, that includes accuracy data, such as metric data, as well as a receiver operating characteristic (ROC) curve associated with the trained ML model. This classification report can be associated with referred to JSON representation. In at least one embodiment, the classification report can be stored as data that belongs to lineage data of the evaluated ML model. In at least one embodiment, data of the classification report is performance data associated with the trained ML model or a plurality of trained ML models.

The ML pipeline workflow 104 can also include a model registration operation 112. Execution of the model registration operation 112 generates an ML model that can include various data related to training the ML model. In at least one embodiment, the ML model generated by the model registration operation 112 is a model package. The model package can be a reusable model artifacts abstraction that packages ingredients for inference. In at least one embodiment, the model registration operation 112 generates an ML model package that comprises an inference specification that defines an inference image to use along with an optional model weights location. In at least one embodiment, the artifacts generated from the ML model training operation 108 are included in the ML model package generated by the model registration operation 112.

The ML model can be stored in a model registry 116 based on an processing of a human-readable ML pipeline 118 and an underlying programmatically defined ML pipeline 120. In at least one embodiment, the artifacts generated from the ML model training operation 108 can be separately stored in an ML model artifacts storage 122. In at least one embodiment, the ML model registry 116 has computer controlled access to the stored ML model artifacts 122. In at least one embodiment, lineage and historical data can be associated with the ML models registered in the ML model registry 116. In at least one embodiment, some or all of the lineage and historical data described herein can be stored in the ML model registry 116. Alternatively, in at least one embodiment, some or all of the lineage and historical data described herein can be stored in one or more computer storages associated with the environment 100. Furthermore, lineage and historical data can be associated with the ML model artifacts 122. This lineage and historical data can be stored in any suitable computer storage and/or database in a searchable manner. The lineage and historical data can include versioning information associated with the stored ML models and the stored artifacts. Furthermore, the lineage and historical data can include temporal information corresponding to the stored ML models and the stored artifacts. This stored lineage and historical data can also refer back to one or more datasets that were used to generate the stored ML models and the resulting artifacts.

The ML pipeline workflow 104 can include a condition operation 114. The condition operation 114 can be executed to check the accuracy of the trained ML model before it is registered by way of the model registration operation 112. In at least one embodiment, the generated trained ML model can be saved in the ML model registry 116 based on a determination that the model exceeds a specified value. In at least one embodiment, the ML model evaluation operation 110 determines an accuracy of a trained ML model generated by the ML model training operation 108. This accuracy generated by the ML model evaluation operation 110 can be a numerical value. This numerical value can be compared to the specified value before a determination is made to store the trained ML model in the ML model registry 116. The condition operation 114 performs the foregoing analysis to determine if it is appropriate to store a trained ML model in the ML model registry 116.

As described, the overall ML pipeline workflow 104 comprises a programmatic syntax. In some embodiments, the ML pipeline workflow 104 is coded in Python, or other suitable programming language. The ML pipeline workflow 104, after the coding thereof is complete, can be stored in a code repository 124. Specifically, the ML pipeline workflow 104 is stored in the code repository 124 as the programmatically defined ML pipeline 120. A user, such as a developer that coded the programmatically defined ML pipeline 120, can cause the ML pipeline workflow 104 to be stored in the code repository 124 as the programmatically defined ML pipeline 120. In at least one embodiment, the CI/CD environment of the developer and computer environment 102 allows the user to cause the storage of the programmatically defined ML pipeline 120 in the code repository 124.

A code processor 126, such as a compiler or other conversion processor, can convert the programmatically defined ML pipeline 120 to the human-readable ML pipeline 118. The human-readable ML pipeline 118 can be in JSON format. The human-readable ML pipeline 118 can also comprise a visual representation of the human-readable ML pipeline 128. In at least one embodiment, the CI/CD environment of the developer and computer environment 102 allows the user to convert, using the code processor 126, the programmatically defined ML pipeline 120 to the human-readable ML pipeline 118. The same process can generate the visual representation of the human-readable ML pipeline 128. In at least one embodiment, the developer and computer environment 102, either automatically or through user interaction, executes the human-readable ML pipeline 118 to generate one or more ML models that are registered in the ML model registry 116. Similarly, artifacts associated with generated one or more ML models can be stored in the ML model artifacts storage 122 based on execution of the human-readable ML pipeline 118.

Figure 2:
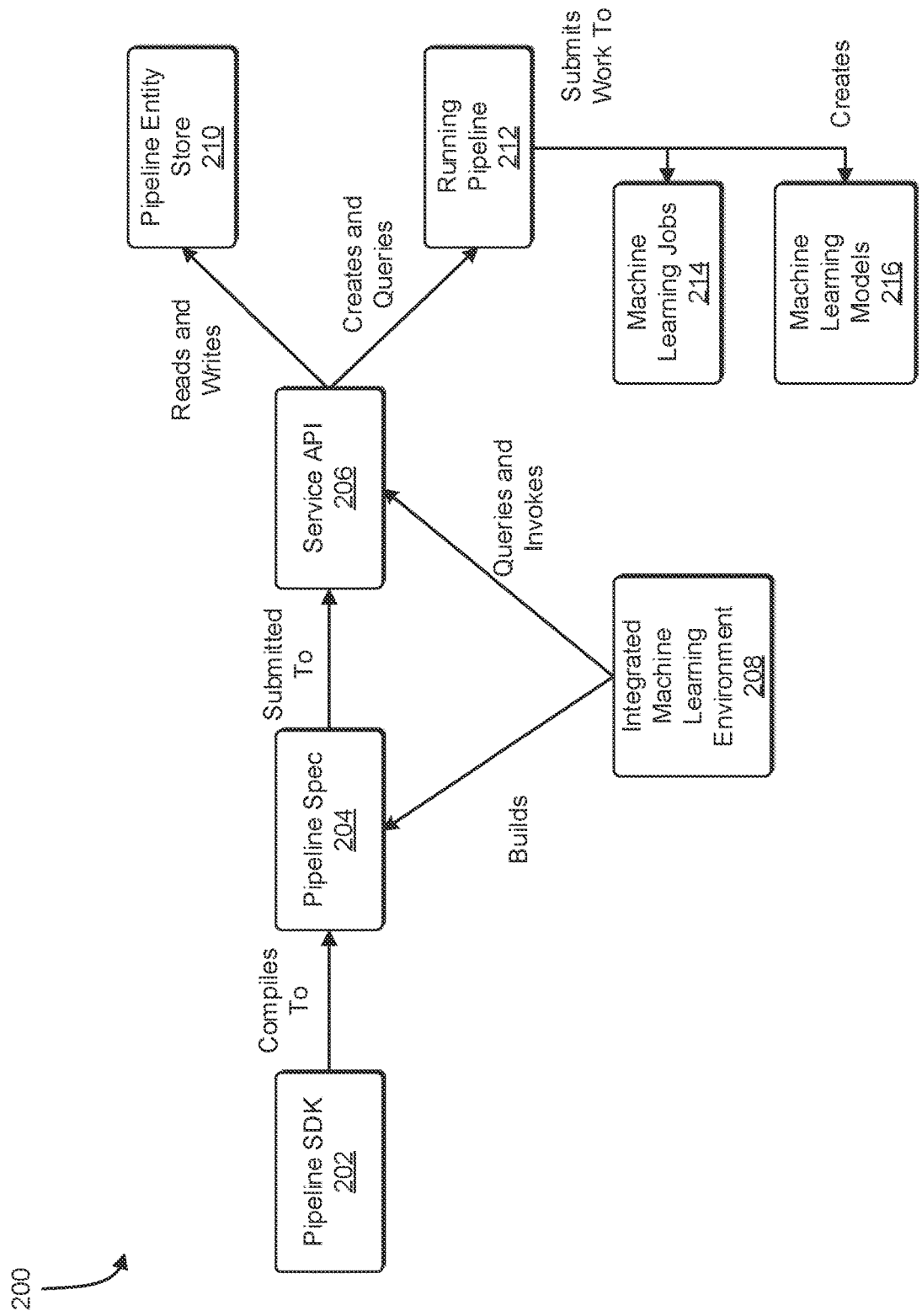
FIG. 2 illustrates a computing environment in which an ML pipeline generating service can be implemented, according to at least one embodiment.

FIG. 2 illustrates a computing environment 200 in which a ML pipeline generating service can be implemented, according to at least one embodiment. Computing environment 200, or a portion thereof, may be implemented in the context of a computing resource service provider. In at least one embodiment, the computing resource service provider is an online service provider that offers one or more services to subscribing customers. One or more of the services can generate one or more ML models as described herein with reference to one or more of the described embodiments.

In at least one embodiment, the computing environment 200 comprises some or all of the elements illustrated and described in conjunction with the computing environment 100. In at least one embodiment, a ML pipeline generating service provides an interface to clients which can be used to create, read, update, and delete ML pipelines that define one or more workflow operations to generate an ML model. In at least one embodiment, ML pipelines are communicated to a web service application programming interface (API) in a human-readable format such as JSON or YAML, which a server persists. Clients of a ML service can start, stop, and resume executions (which may be termed as "runs") of a ML pipeline on public operations of a service API. In at least one embodiment, the ML pipeline execution is delegated to an internal pipeline execution engine.

Pipeline SDK 202 refers to any suitable SDK that can be used to specify and run ML pipeline workflows, according to at least one embodiment. A pipeline may refer to a description of a ML workflow, including the components that make up the operations in the workflow and how components interact with each other. Pipeline SDK 202 may be implemented as a ML pipeline Python SDK, Kubeflow Pipelines (KFP) compiler, TensorFlow Extended (TFX) compiler, metaflow compiler, etc. Any suitable pipeline SDK 202 may be utilized to compile a pipeline spec 204. In an embodiment, the pipeline spec 204 comprises a human-readable ML pipeline derived from a programmatically defined ML pipeline. In at least one embodiment, the human-readable ML pipeline also comprises a visual representation of the ML pipeline. The visual representation of the ML pipeline can be in the form of a graph with one or more nodes. As previously described, the graph can be a DAG.

In at least one embodiment, a pipeline spec 204 may refer to a computer program. In at least one embodiment, pipeline spec 204 is a document written in a human-readable format such as JSON which defines a series of compute tasks with control flow statements. In at least one embodiment, customers of a computing resource service provider submit pipeline spec 204 to a ML service for execution via a call to a web service API 206 such as an API to create or update a pipeline. Web service API call 206 may be invoked by calling ML service API endpoints. In at least one embodiment, each pipeline version is uniquely identified within a computing resource service provider endpoint, which may be encode as a resource name specific to a pipeline, plus a version identifier. The foregoing information can be stored as lineage data or historical data relating to the pipeline spec 204. Specifically, pipeline versions may be tracked internally by a ML service and customers can retrieve the version of a pipeline that was used in a particular execution of a pipeline.

Service API 206 may call an API gateway frontend with private APIs and serve requests. Different serverless event-driven functions may be utilized to create, delete, update, query, etc. ML pipelines. Each supported activity may have a corresponding event-driven function. API gateway may proxy requests to corresponding activity event-driven functions. In at least one embodiment, an architecture for a ML includes one or more API gateways, one or more serverless event-drive functions, one or more data stores for the ML pipelines, which may include storage containers, databases, etc.

In at least one embodiment, an ML pipeline comprises the following structure: metadata; parameters; and operations. Metadata may refer to a mapping (e.g., string to string map) of metadata. Parameters may refer to a list of named ML pipeline parameters that define global parameters to the ML pipeline that can be submitted when the pipeline is run. Parameters may be constrained and/or typed. Parameters may have default values which are used in the absence of a specific value being specified. Operations may refer to the different type of operations that can be performed as part of a ML pipeline. A DAG may be used to represent a graph of work to do where nodes represent various operations and edges represent dependencies. For example, operations may include one or more of the following: running ML training jobs; running ML processing jobs; running ML transform jobs; running ML tuning jobs; running serverless interactive query service queries; importing data storage service data into an online feature group; registering ML models; conditional execution of sub-graphs; and more. As defined by the DAG, operations of a ML pipeline can be executed in parallel. In at least one embodiment, each operation of the ML pipeline is declarative and includes a number of parameters that can be specified as literals, expressions involving variables available at runtime, pipeline parameters, or properties of preceding operations. Various operations of the ML pipeline may have different properties that can be referenced by downstream operation parameters. Using properties of one operation as parameters to another operation may indicate a precedence relationship between two operations—this precedence relationship may define a DAG of operations to execute.

In at least one embodiment, when defining a pipeline, pipeline authors write literals for variables. For example, literals supported in JSON may include integers, floating points, timestamps, Booleans, string-maps, lists, and more. Variables may be defined as parameter definitions or processing output properties. Each variable definition may be a JSON object that includes properties for the name of the variable, the type of the property, and (if applicable) a default value for the property. For collection variables (e.g., lists and maps) the type may also specify the value, so that the map type may be "Map[<Type>]" where "Type" is a type definition which can itself also be a map or list. A corresponding list may be described as "List[<Type>]." For example, the following describes examples of several variable definitions:

```
{
    "Name": "learning-rate",
    "Type": "Float"
},
{
```

```
    "Name": "models",
    "Type": "List[String]",
    "Default": ["logistic-regression", "svm"]
},
{
    "Name": "map-of-lists",
    "Type": "Map[String, List[String]]"
},
{
    "Name": "a-string-variable"
}
```

Variables may be referenced using a "Get" object function. This may be an object with a single property named "Get," the value of which is a string literal that references the name of a variable. The following is an example of a "Get" function:

```
{
    "Get": "Parameters.learning-rate"
}
```

Variables can be referenced using string templating, for example, in the following manner:

```
{
    "Arguments": {
        "data": "DataStorageService://{{parameters.bucket}}/some/prefix"
    }
}
```

For collections such as maps and lists, elements may be referenced using square braces to indicate the key and index, respectively. For example, for a map variable named "my-ma" the following code sample would retrieve the value for the "my-key" element in the map:

{"Get": "my-map[my-key]"}

Likewise, the following code sample retrieves the third value from the "my-list" list, assuming a zero-indexed list:

{"Get": "my-list[2]"}

In at least some embodiments, missing elements or out-of-bounds references are errors and may cause pipeline execution to fail. In at least some cases, collection elements are referenced by literal keys and indexes rather than variables.

A parameters list may be a property of a pipeline JSON document, as described above. In at least one embodiment, parameters are a list of named parameter objects that each produce a new variable into a ML pipeline document. These variables may be referenced in operation arguments. In at least one embodiment, parameters are strongly typed with a default type of String (e.g., if no type is specified, it is assumed to be a String type).

In various embodiments, all parameters are required unless they have a default value, which may be used in the absence of an explicitly set value for a parameter. This is a way to enforce null safety in a ML pipeline definition, but other techniques for enforcing null safety are also contemplated within the scope of the disclosure. In at least some embodiments, String type parameters can support Enum values.

A condition list may be a list of Boolean expressions on a condition operation that controls or permits the condition execution of one or more sub-operations. Conditions may refer to Boolean expressions that reference ML variables.

Multiple conditions may be evaluated as a logical conjunction or disjunction. For example, if a list is a conjunction, each individual condition must evaluate to be true for the condition list to be true. In some embodiments, collections are disallowed in condition expressions, although individual elements of collections may be referenced in condition expressions. Negations of any conditional expression may also be supported. Condition expressions may support various expressions, such as greater than, greater than or equal to, less than, less than or equal to, equals, in (determines whether an argument is in a list of values with the same type), and various string expressions such as begins with (e.g., a prefix match), ends with (e.g., a suffix match), substring of, and matches (e.g., two string arguments where the second is a regular expression). An example of a condition list is provided below:

```
"Conditions": [
    {
        "Type": "GreaterThan",
        "LeftValue": {"Get": "Parameters.learning_rate"},
        "RightValue": 0
    },
    {
        "Type": "Not",
        "Expression": {
            "Type": "Equals",
            "LeftValue": {"Get": "Parameters.non_zero"}
            "RightValue": 0
        }
    },
    {
        "Type": "Or",
        "Expressions": [
            {
                "Type": "GreaterThan",
                "LeftValue": {"Get": "Parameters.positive"},
                "RightValue": 0
            },
            {
                "Type": "Equals",
                "LeftValue": {"Get": "Parameters.non_zero"},
                "RightValue": 0
            }
        ]
    },
    {
        "Type": "Matches",
        "Value": {"Get": "Parameters.bucket"},
        "Pattern": "^[a-z\\-]+$"
    },
    {
        "Type": "SubstringOf",
        "LeftValue": "devo"
        "RightValue": {"Get": "Parameters.bucket"}
    },
    {
        "Type": "BeginsWith",
        "LeftValue": {"Get": "Parameters.bucket"},
        "RightValue": "stages-us-west-2"
    },
    {
        "Type": "EndsWith",
        "LeftValue": {"Get": "Parameters.bucket"},
        "RightValue": "ml-data"
    },
    {
        "Type": "In",
        "Value": {"Get": "Parameters.algorithm"},
        "List": ["svm", "logistic-regression", "knn"]
    }
]
```

Various functions may be supported, such as the "Get" function described above. Other functions that may be supported may include a "Join" and "JsonGet" function. Functions can be used to provide values for arguments to operations in a ML pipeline. In at least some embodiments, functions are evaluated by an executor immediately prior to executing the operation. A "Join" function may join a list of strings together, using a delimiter, returning an output string. A "Substitution" function may substitute values from one string into another. A "JsonGet" function may extract a member from a JSON object. In some cases, JsonGet may be restricted to being JSON nodes that map to certain primitive types: nulls, strings, numbers, and Booleans. A JsonGet may read a JSON file from a data storage service and make its contents available as a primitive value that can be used to configure execution of a ML pipeline.

Operations in a ML pipeline may have various aspects, including operation definitions, operation parameters, operation properties, and an operation execution model. An example of an operation definition is provided below:

```
{
    "Name": "my-operation",
    "Type": "ExampleOperationType",
    "CacheConfig": "cacheable",
    "Arguments": {
        "name": "Owen",
        "likes-chocolate": true,
        "number-of-children": 2,
        "family": [
            {
                "name": "Susan",
                "relationship": "Mother"
            },
            {
                "name": "Lizzie",
                "relationship": "Daughter"
            },
            ...
        ]
    }
}
```

Operation definition may be viewed as a function invocation in a programming language—in the example above, the "ExampleOperationType" function is being invoked with four named arguments being passed into the function—"Name," "Likes-Chocolate," "Number-of-Children," and "Family."

Operations may have arguments. Each argument to a function may be named and typed as described above. Argument values may be defined using JSON literals using a "Get" function or other functions such as "Join." The "Get" function specifies that an argument value is retrieved from a property at runtime. In at least some embodiments, properties are statically typed, which permits static type checking of property references at compile time.

Each property may exist in a namespace. In various embodiments, properties can exist in one of three different namespaces: execution, operations, and parameters. Execution namespace may be suitable for runtime properties, such as the start date of a ML pipeline or the current ML pipeline's execution identifier. The operations namespace may include properties for each operation in a DAG, such as the status of a training operation in a ML pipeline. The parameters workspace may include values for the parameters to a ML pipeline execution.

Arguments and string templates can reference ML pipeline execution properties. Variables may include a start time of when the ML pipeline run was started, current time of when an operation in a ML pipeline is scheduled, pipeline name of the current ML pipeline, pipeline identifier of the current ML pipeline, experiment name, and trial name.

Operations may have properties. Variables can be accessed after operations have been completed. Operation properties can be passed as arguments to other operations to form a dependency relationship that is encoded in a directed acyclic graph. Each operation property is named, typed, and referenced as using the operation name, according to at least one embodiment. Described below is an example in which "example_property" of "operation_one" to the "foo" argument of "operation_two":

```
{
  "Name": "operation_two",
  "Type": "ExampleOperationType",
  "Arguments": {
    "Foo": {"Get": "Operations.operation_one.example_property"}
  }
}
```

An operation of a ML pipeline is eligible for execution when each argument value can be evaluated, either because they are defined literally, defined from pipeline parameters, or defined from properties of an operation that has finished executing. Once an operation finishes executing, its property values can be consumed by other operations.

In at least one embodiment, an operation is eligible for execution when all references in its arguments object are resolved. For example, when an operation finishes executing, it may be completed or failed; if an operation completes successfully, then references to its properties can be resolved. In turn, the successful execution of one operation may lead to other operations becoming eligible for execution, and so on. In this model, an operation is said to execute atomically, meaning that its properties don't resolve until it enters a completed state, according to at least one embodiment.

A DAG of a ML pipeline may be used to coordinate execution of operations. A ML pipeline begins execution with one or more operations that are immediately available for execution according to a DAG, and the ML pipeline continues executing until an operation failure occurs or when there are no further variables to propagate and all operations have completed executing. In at least some embodiments, when an operation fails it does not generate properties. Operations that reference properties on failed operations do not become eligible for execution in at least one embodiment. Furthermore, upon failure of an operation, a ML pipeline enters into a failed state. In some cases, failure of one operation results in the propagation of failures to other operations which have not yet been executed. A ML pipeline itself may be marked as having failed when all operations that are executing in a failed pipeline complete.

From a user or customer perspective, an operation may fail for various reasons. For example, a failure in scheduling an operation may be due to customer error, such as when an argument references a property value that does not exist or if there was an internal error scheduling an operation. A terminal failure running an operation due to customer error may occur when a training job exited with an exit code indicating a failure. As another example, there may be transient failures scheduling or running an operation that broken during internal retry mechanisms within an executor.

The environment 200 can include an integrated ML environment 208, which may refer to software that can be used to build, train, deploy, and analyze ML models. Integrated ML environment 208 may be a web-based, IDE for ML. Integrated ML environment 208 may be utilized to manage ML pipelines and provide a visual user interface for monitoring, comparing, and experimenting ML pipeline runs. Integrated ML environment 208 may be utilized to build pipeline specs and submits queries and invokes via service APIs.

Various service APIs may be used to submit reads and writes to pipeline entity store 210. Service APIs may also be used to submit creates and queries to running pipeline 212. For example, service API 206 may include a set of commands to create a pipeline, query a pipeline, resume a pipeline, stop a pipeline, and so on. An ML pipeline may submit work to ML jobs 214 and may be used to create ML models 216.

FIGS. 3 and 4 illustrate an exemplary operation definition related to a data preparation operation 300. In at least one embodiment, the data preparation operation 106 illustrated in FIG. 1 comprises the data preparation operation 300. The operational definition related to the data preparation operation 300 refers to and uses the UCI Machine Learning Abalone Dataset, which is publically available and readily locatable through an Internet search. However, any suitable learning dataset can be used one or more of the described embodiments, including those provided by users and customers that interface with the computer environment 100 and/or 200. The dataset comprises the following features: length—The longest shell measurement of the abalone; diameter—The diameter of the abalone perpendicular to its length; height—The height of the abalone with meat in the shell; whole_weight—The weight of the whole abalone; shucked_weight—The weight of the meat removed from the abalone. viscera_weight—The weight of the abalone viscera after bleeding; shell_weight—The weight of the abalone shell after meat removal and drying; sex—The sex of the abalone; One of 'M', 'F', or 'I', where 'I' is an infant abalone; and rings—The number of rings in the abalone shell.

The number of rings in the abalone shell is a good approximation for its age using the formula age=rings+1.5. However, obtaining this number is a time-consuming task. One must cut the shell through the cone, stain the section, and count the number of rings through a microscope. However, other physical measurements are easier to determine. The operations of the described ML pipeline uses the dataset to build a predictive model of the variable rings using the other physical measurements.

The dataset can be downloaded using the following code:

```
!mkdir -p data
local_path = "data/abalone-dataset.csv"
s3 = boto3.resource("s3")
s3.Bucket(f"IDE-servicecatalog-seedcode-{region}").download_file(
    "dataset/abalone-dataset.csv",
    local_path
)
base_uri = f"s3://{ default_bucket}/abalone"
input_data_uri = IDE.s3.S3Uploader.upload(
    local_path=local_path,
    desired_s3_uri-base_uri,
)
print(input_data_uri)
```

The code above and in the following refers to an S3 storage location, but any suitable computer storage location can be used. In at least one embodiment, the IDE referred to above and in the following can be SageMaker. However, the IDE can also include other ML platforms for developers, users, and customers. In an embodiment, the IDE is part of the integrated machine learning environment 208 and/or the developer and computer environment 102.

Also, a second dataset can be downloaded for batch transformation for use after an ML model is created using the following:

```
local_path = "data/abalone-dataset-batch"
s3 = boto3.resource("s3")
s3.Bucket(f"IDE-servicecatalog-seedcode-{region}").download_file(
    "dataset/abalone-dataset-batch",
    local_path
base_uri = f"s3://{default_bucket}/abalone"
batch_data_uri = IDE.s3.S3Uploader.upload(
    local_path=local_path,
    desired_s3_uri=base_uri,
)
print(batch_data_uri)
```

In at least one embodiment, parameters for the ML pipeline can be defined, which can include: processing_instance_type—the ml.* instance type of the processing jobs; processing_instance_count—the instance count of the processing job; training_instance_type—the ml.* instance type of the training jobs; input_data—the S3 location of the input data; batch_data—the S3 location of the input data for batch transformation; and model_approval_status—the approval status to register the trained model with in the IDE environment, such as a CI/CD environment provided by the developer and computer environment 102 shown in FIG. 1. The operation code is:

```
from IDE.workflow.parameters import (
    ParameterInteger,
    ParameterString,
)
processing_instance_count = ParameterInteger(
    name="ProcessingInstanceCount",
    default_value=1
)
processing_instance_type = ParameterString(
    name="ProcessingInstanceType",
    default_value="ml.m5.xlarge"
)
```

-continued

```
training_instance_type = ParameterString(
    name="TrainingInstanceType",
    default_value="ml.m5.xlarge"
)
model_approval_status = ParameterString(
    name="ModelApprovalStatus",
    default_value="PendingManualApproval"
)
input_data = ParameterString(
    name="InputData",
    default_value=input_data_uri,
)
batch_data = ParameterString(
    name="BatchData",
    default_value-batch_data_uri,
)
```

A directory can be created for feature engineering to be executed by the data preparation operation 300. The directory for processing can be allocated using !mkdir -p abalone. The data preparation operation creates a file in the/abalone directory named preprocessing.py with the following content. This preprocessing script is passed in to the preparation operation 300 for execution on the input data. A training step, such as the ML training operation 108 or 500, then uses the preprocessed training features and labels to train an ML model, and the evaluation step, such as the ML model evaluation operation 110 or 600, uses the trained ML model and preprocessed test features and labels to evaluate the trained ML model. The script uses scikit-learn to do the following: fill in missing sex categorical data and encode it so it is suitable for training; scale and normalize all numerical fields except for rings and sex; and split the data into training, test, and validation datasets. FIGS. 3 and 4 illustrate the data preparation operation 300 and the code associated therewith.

The code to generate the datasets, associated with the data preparation operation 300 in at least one embodiment, can include:

```
from IDE.processing import ProcessingInput, ProcessingOutput
from IDE.workflow.steps import ProcessingStep
    step_process = ProcessingStep(
        name="AbaloneProcess",
        processor=sklearn_processor,
        inputs=[
            ProcessingInput(source=input_data, destination="/opt/ml/processing/input"),
        ],
        outputs=[
            ProcessingOutput(output_name="train", source="/opt/ml/processing/train"),
            ProcessingOutput(output_name="validation",
                source="/opt/ml/processing/validation"),
            ProcessingOutput(output_name="test", source="/opt/ml/processing/test")
        ],
        code="abalone/preprocessing.py",
    )
```

Figure 5:
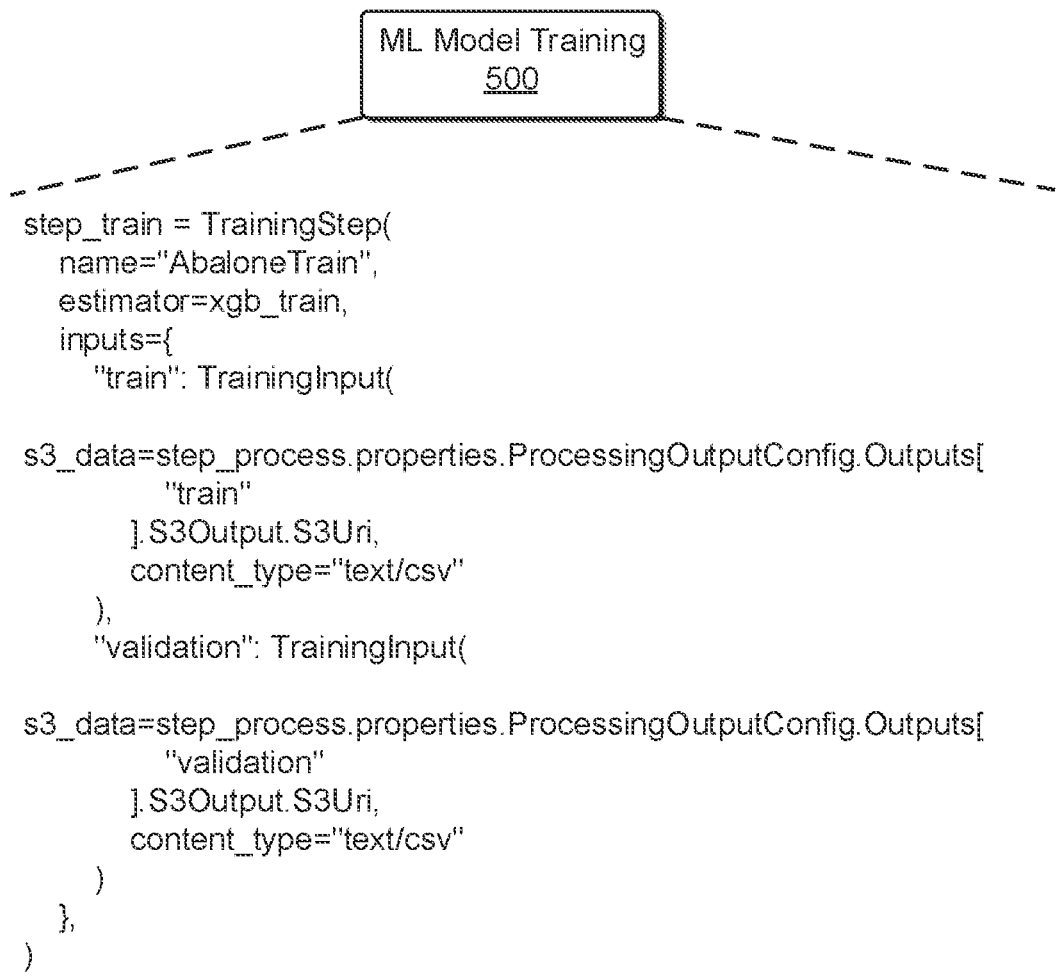
FIG. 5 illustrates an exemplary operation definition related to training an ML model to generate a trained ML model, according to at least one embodiment.

FIG. 5 illustrates an exemplary operation definition 500 related to a training to generate a trained ML model. In at least one embodiment, the ML training operation 108 illustrated in FIG. 1 comprises the training operation 500. The training operation 500 can configure an estimator for the XGBoost algorithm and the input dataset. The training_instance_type can be passed into the estimator. A typical training script loads data from the input channels, configures training with hyperparameters, trains a model, and saves a model to model_dir so that it can be hosted later. The IDE uploads the model to an S3 storage in the form of a model.tar.gz at the end of the training job, but any suitable storage can be used based on implementation particulars.

FIG. 6 illustrates an exemplary operation definition 600 related to evaluating a trained ML model. In at least one embodiment, the ML model evaluation operation 110 illustrated in FIG. 1 comprises the evaluation operation definition 600. The evaluation operation definition 600 can generate a file in the/abalone directory named evaluation.py. A script is used in a processing step to perform model evaluation. The script takes a trained ML model and the test dataset as input, then produces a JSON file containing classification evaluation metrics. The evaluation metrics are stored as performance data for the trained ML model. These metrics can include a precision, recall, and an F1 score for each label. The metrics can also include an accuracy and ROC curve for the trained ML model.

Figure 7:
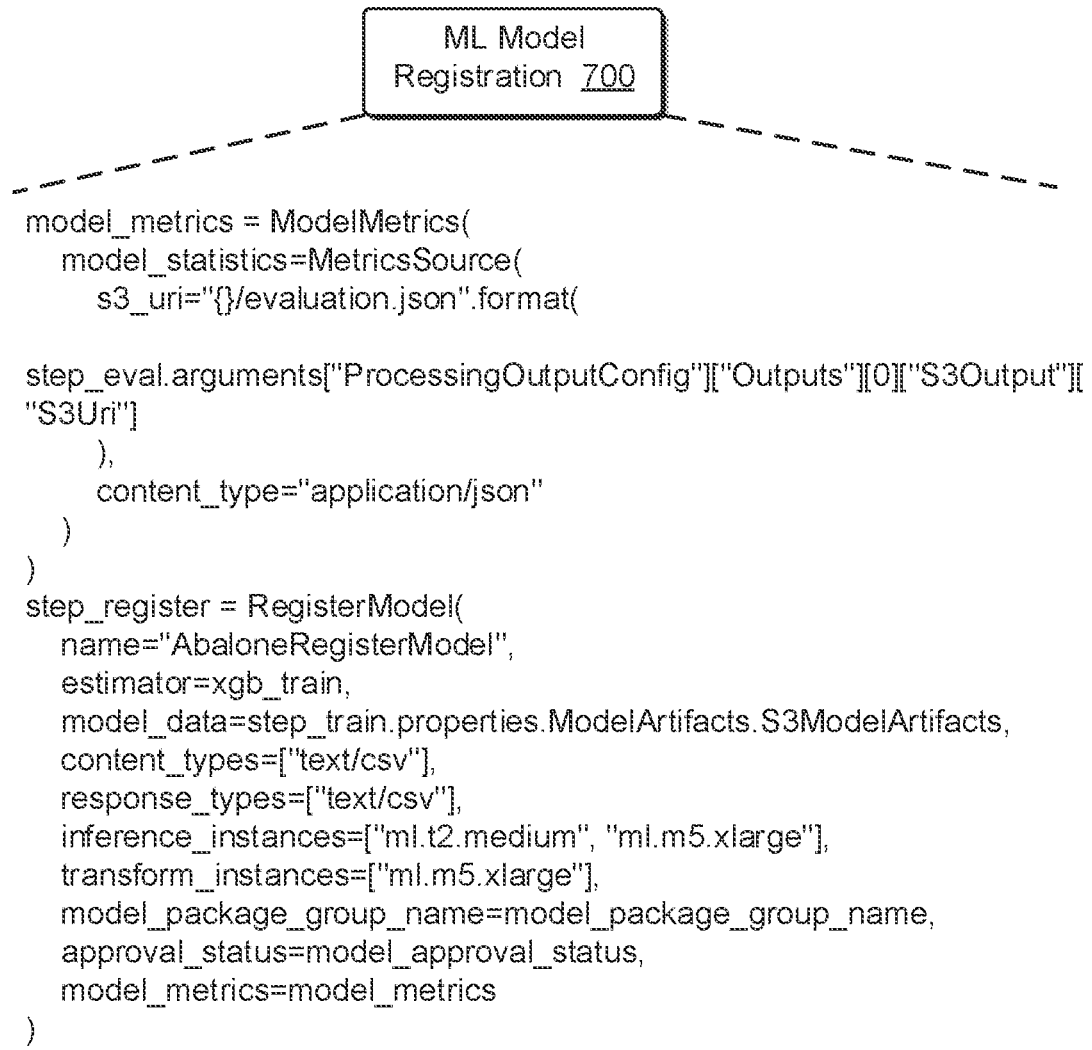
FIG. 7 illustrates an exemplary operation definition related to registering a trained and evaluated ML model, according to at least one embodiment.

FIG. 7 illustrates an exemplary operation definition 700 related to registering a trained and evaluated ML model. In at least one embodiment, the ML registration operation 112 illustrated in FIG. 1 comprises the registration operation definition 700. In at least one embodiment, the result of executing the operation definition 700 in a pipeline is an ML model package. The ML model package is a reusable model artifacts abstraction that packages all ingredients necessary for inference. It includes an inference specification that defines the inference image to use along with an optional model weights location. A model package group is a collection of model packages.

Figure 8:
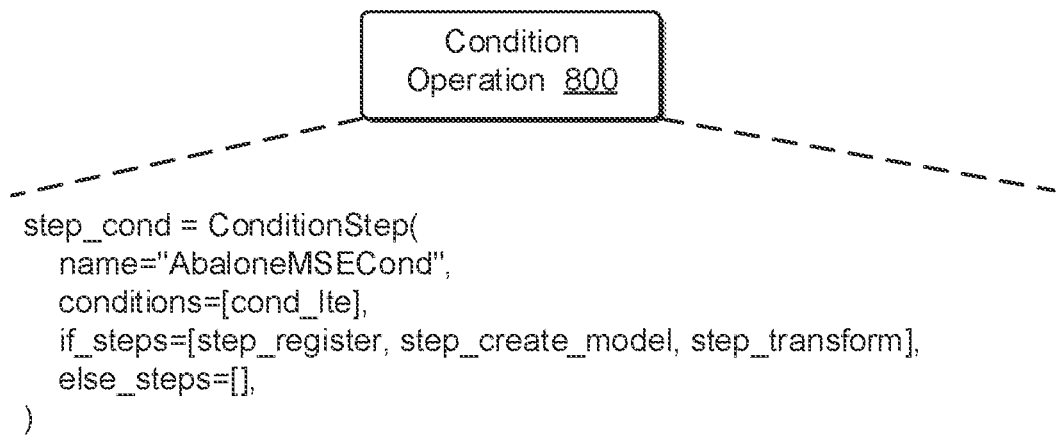
FIG. 8 illustrates an exemplary operation definition related to performing a condition step to verify a trained and evaluated ML model in advance of registering the model, according to at least one embodiment.

FIG. 8 illustrates an exemplary operation definition 800 related to performing a condition step to verify a trained and evaluated ML model in advance of registering the model. In at least one embodiment, the condition step operation 114 illustrated in FIG. 1 comprises the exemplary operation definition 800. The condition step operation 800 allows ML pipelines, such as the ML pipeline workflow 104, to support conditional execution in the pipeline DAG based on the condition of step properties. The ML model package is registered if the accuracy of that model, as determined by the model evaluation step, exceeds the required value. If the accuracy exceeds the required value, the pipeline runs batch transformation on a dataset.

In at least one embodiment, each of the operations illustrated in FIGS. 3-8 can be executed to generate a programmatically defined ML pipeline, such as the programmatically defined ML pipeline 120 illustrated in FIG. 1. The following code can be used to generate the programmatically defined ML pipeline:

```
pipeline_name = f"AbalonePipeline"
pipeline = Pipeline(
    name=pipeline_name,
    parameters=[
        processing_instance_type,
        processing_instance_count,
        training_instance_type,
```

-continued

```
        model_approval_status,
        input_data,
        batch_data,
    ],
    steps=[step_process, step_train, step_eval, step_cond],
)
```

The programmatically defined ML pipeline can be processed, converted, or otherwise compiled to generate a JSON pipeline definition, such as the human-readable ML pipeline 118. In at least one embodiment, the human-readable ML pipeline 118 can be expressed as a visual representation of the human-readable ML pipeline 128. The human-readable ML pipeline 118 and the visual representation of the human-readable ML pipeline 128 are illustrated in FIG. 1.

Figure 9:
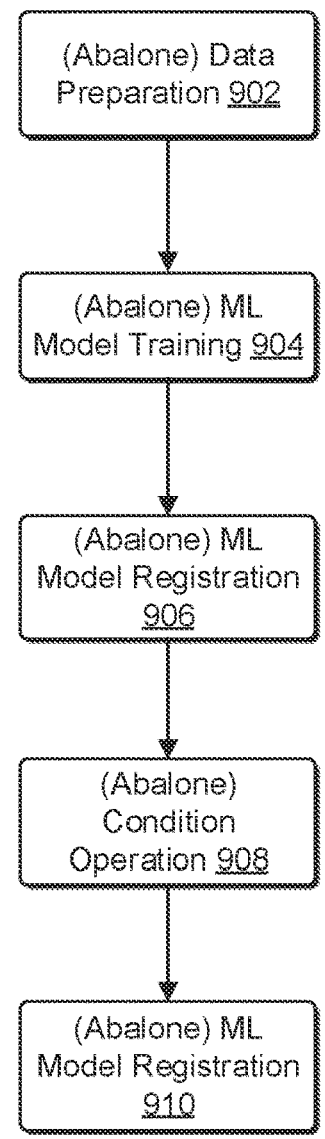
FIG. 9 illustrates a human-readable ML pipeline represented visually, according to at least one embodiment.

FIG. 9 illustrates a human-readable ML pipeline 900 represented visually, in accordance with at least one embodiment. The human-readable ML pipeline 900, represented visually, can include a data preparation operation box 902, an ML model training operation box 904, an ML model registration operation box 906, a condition operation box 908, and an ML model registration box 910. In at least one embodiment, the boxes of the pipeline 900 correspond to one or more of the programmatically defined operations of the pipeline workflow 104, illustrated in FIG. 1. In at least one embodiment, the data preparation operation box 902 corresponds to the data preparation operation 106, the ML model training box 904 corresponds to the ML model training operation 108, the ML model registration box 906 corresponds to the model evaluation operation 110, the condition operation box 908 corresponds to the condition operation 114, and the ML model registration box 910 corresponds to the ML model registration operation 112. In at least one embodiment, the human-readable ML pipeline 900 represented visually, as illustrated in FIG. 9, can be displayed on a display device associated with a computing device. For example, the human-readable ML pipeline 900 represented visually can be caused to be displayed on the display device within an IDE, such a CI/CD environment. Each of the boxes 902-910 can comprise underlying data associated with the programmatically defined ML pipeline, such as the pipeline 120, and processed to generate the human-readable ML pipeline 900.

Figure 10:
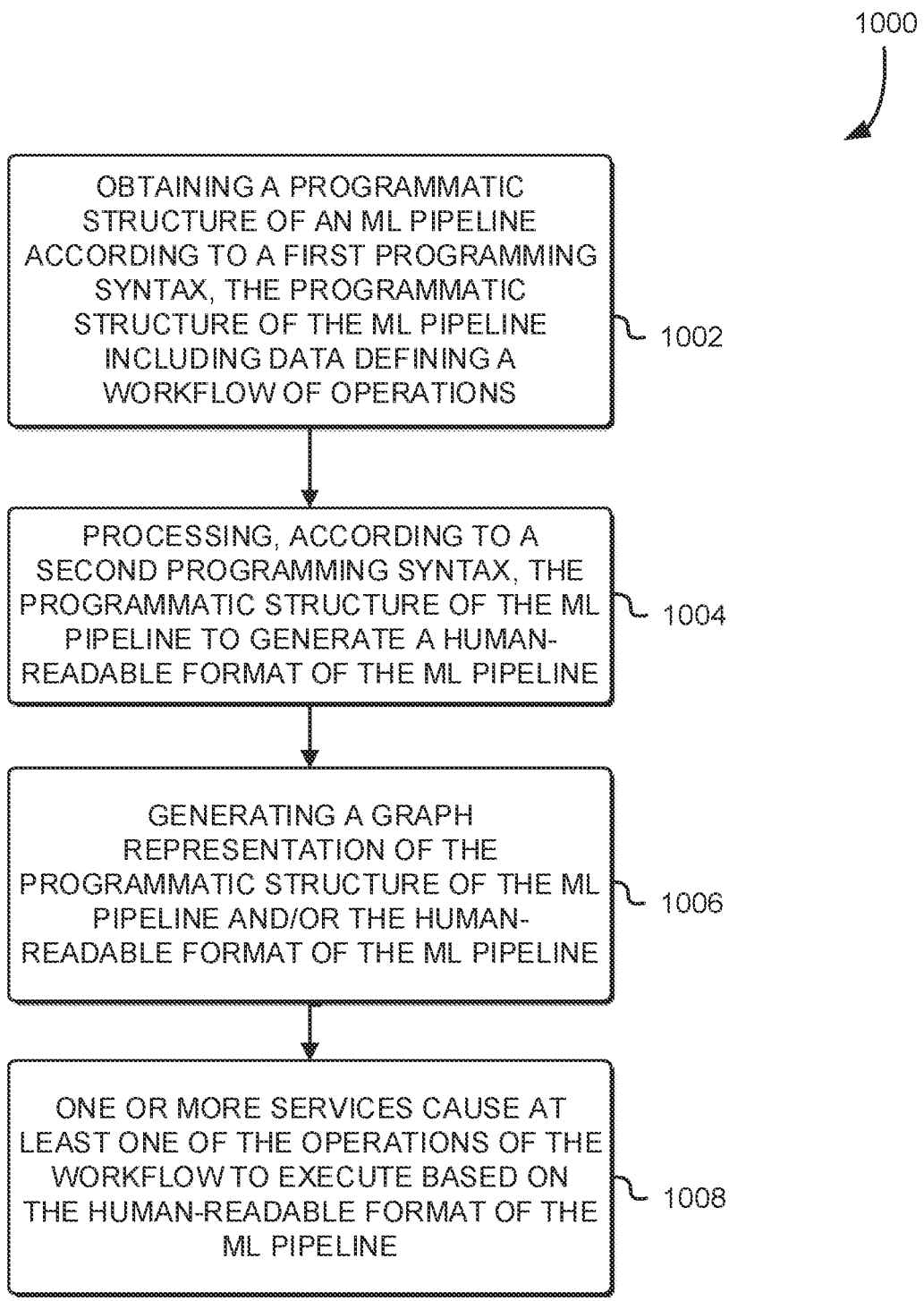
FIG. 10 illustrates a flow diagram including various processing acts, implemented by a system environment with one or more computing devices or nodes, which provide for generating ML pipelines and converting ML pipelines that can be executed to perform ML actions, in accordance with at least one embodiment.

FIG. 10 illustrates a flow diagram 1000 including various processing acts, implemented by a system environment with one or more computing devices or nodes, which provide for generating ML pipelines and converting ML pipelines that can be executed to perform ML actions, in accordance with at least one embodiment. In some implementations, the acts of the flow diagram 1000 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1000 to provide ML operations expressed programmatically and/or visually.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 1002, a programmatic structure of an ML pipeline according to a first programming syntax is obtained. In at least one embodiment, the programmatic structure of the ML pipeline can include data defining a workflow of operations. The workflow of operations can obtain data to be used to train an ML model, train the ML model using the data, and deploy the ML model to perform inferencing. In at least one embodiment, the workflow of operations comprise one or more of the pipeline operations associated with the pipeline workflow 104 illustrated in FIG. 1. In an example, the programmatic structure of the ML pipeline can comprise the programmatically defined ML pipeline 120 generated from the pipeline workflow 104.

At 1004, the programmatic structure of the ML pipeline is processed to generate a human-readable format of the ML pipeline. In at least one embodiment, the human-readable format of the ML pipeline is processed according to a second programming syntax that is different than the first programming syntax. In at least one embodiment, the human-readable format of the ML pipeline is a JSON representation of the programmatically defined ML pipeline at 1002. In at least one embodiment, the human-readable format of the ML pipeline comprises the human-readable ML pipeline 118 illustrated in FIG. 1.

At 1006, the human-readable format of the ML pipeline is generated as a graph representation of the programmatic structure of the ML pipeline. In at least one embodiment, the graph representation is based on the human-readable format of the ML pipeline. In at least one embodiment, the graph representation comprises one or more nodes. The one or more nodes can correspond to at least one ML operation defined programmatically by the programmatic structure of the ML pipeline. The graph representation can be a DAG, and the one or more nodes of the graph representation can be vertices of the DAG. In at least one embodiment, the human-readable format of the ML pipeline comprises the human-readable ML pipeline 118. In at least one embodiment, the graph representation of the programmatic structure of the ML pipeline comprises the visual representation of the human-readable ML pipeline 128 and/or the human-readable ML pipeline 900 represented visually in FIG. 9.

At 1008, one or more services cause at least one of the operations of the workflow to execute based on the human-readable format of the ML pipeline. In at least one embodiment, the one or more services are associated with an online service provider that provides ML services to its users and customers. In at least one embodiment, the one or more services can be in part of the computing environments 100 and/or 200.

Figure 11:
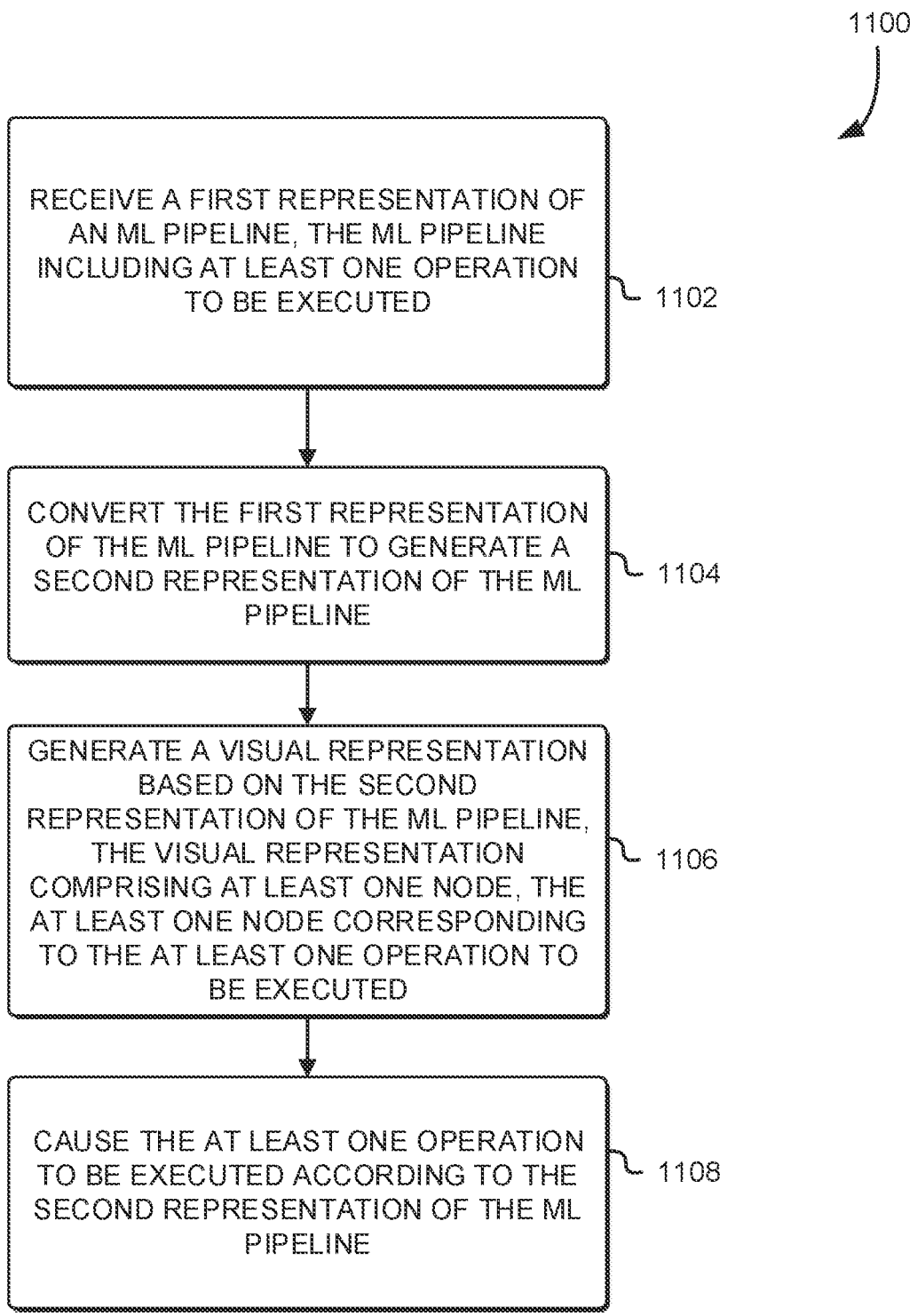
FIG. 11 illustrates a flow diagram including various processing acts, implemented by a system environment with one or more computing devices or nodes, which provide for generating ML pipelines and converting ML pipelines that can be executed to perform ML actions, in accordance with at least one embodiment.

FIG. 11 illustrates a flow diagram 1100 including various processing acts, implemented by a system environment with one or more computing devices or nodes, which provide for generating ML pipelines and converting ML pipelines that can be executed to perform ML actions, in accordance with at least one embodiment. In some implementations, the acts of the flow diagram 1100 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1100 to provide ML operations expressed programmatically and/or visually.

At 1102, a first representation of an ML pipeline is received. In an embodiment, the ML pipeline includes at least one operation to be executed. The ML pipeline can be a programmatically defined ML pipeline. The programmatically defined ML pipeline can comprise the programmatically defined ML pipeline 120 illustrated in FIG. 1. In at least one embodiment, the ML pipeline comprises computer-executable instructions. These computer-executable instructions can comprise computer code. In at least one embodiment, the computer code is Python computer code.

At 1104, the first representation of the ML pipeline is converted to generate a second representation of the ML pipeline. In at least one embodiment, the second representation of the ML pipeline is in human-readable format. For example, the human-readable format can be in JSON format, or other similar data centric syntax. In at least one embodiment, the second representation of the ML pipeline comprises at least the human-readable ML pipeline 118 illustrated in FIG. 1.

At 1106, a visual representation of the second representation of the ML pipeline is generated. In at least one embodiment, the visual representation is generated from a human-readable format of the second representation of the ML pipeline. In at least one embodiment, the visual representation comprises the visual representation of the human-readable ML pipeline 128 illustrated in FIG. 1.

At 1108, in operation is caused to be executed. In at least one embodiment, the operation is associated with the second representation of the ML pipeline. In at least one embodiment, the operation is associated with the second representation of the ML pipeline and based on the first representation of the ML pipeline. In at least one embodiment, the operation is associated with one or more of the operations of the pipeline workflow 104 illustrated in FIG. 1.

Figure 12:
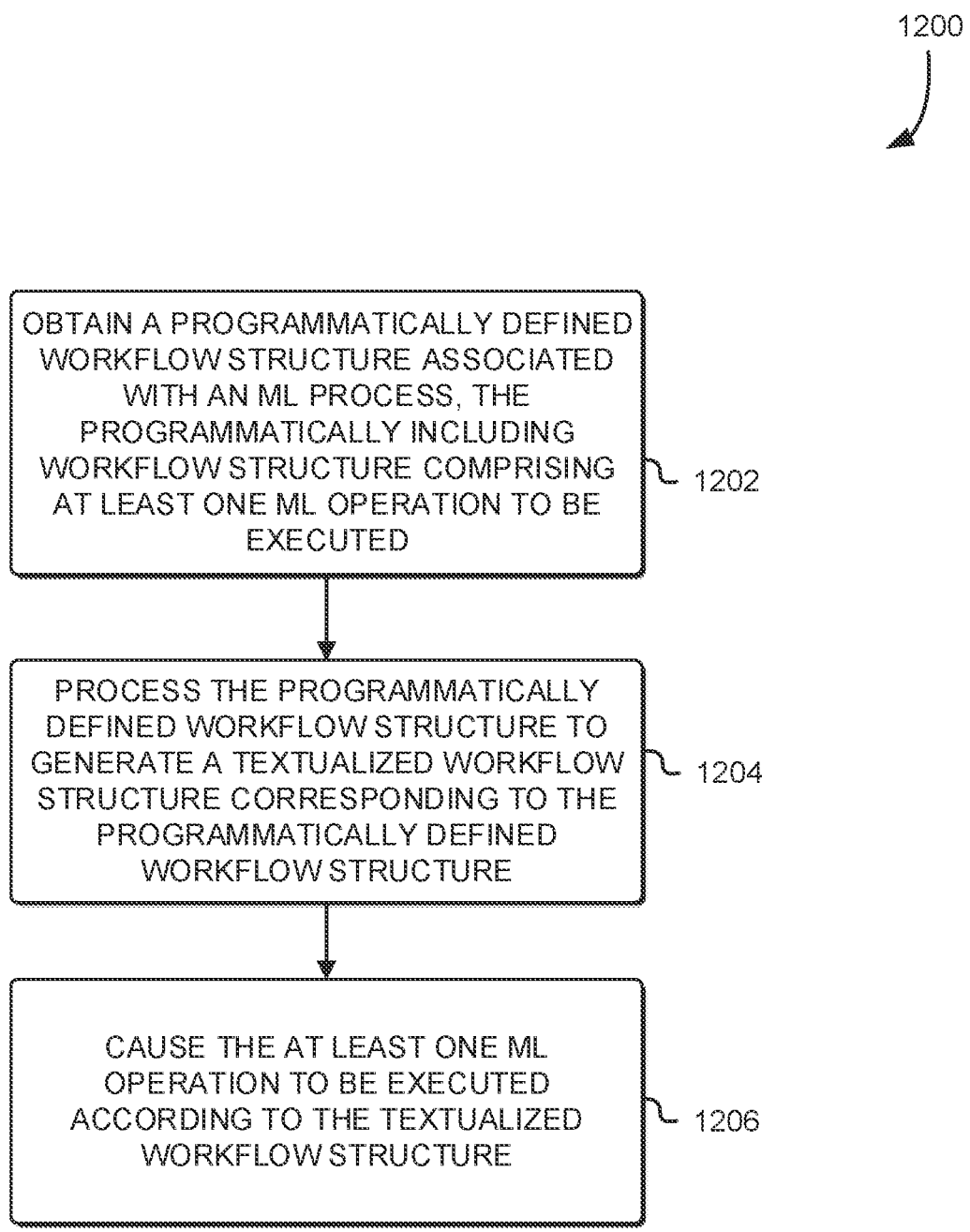
FIG. 12 illustrates a flow diagram including various processing acts, implemented by a system environment with one or more computing devices or nodes, which provide for generating ML pipelines and converting ML pipelines that can be executed to perform ML actions, in accordance with at least one embodiment.

FIG. 12 illustrates a flow diagram 1200 including various processing acts, implemented by a system environment with one or more computing devices or nodes, which provide for generating ML pipelines and converting ML pipelines that can be executed to perform ML actions, in accordance with at least one embodiment. In some implementations, the acts of the flow diagram 1200 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1200 to provide ML operations expressed programmatically and/or visually.

At 1202, a programmatically defined workflow structure of an ML process is obtained. In at least one embodiment, the programmatically defined workflow structure can include at least one ML operation to be executed. The workflow structure can be a programmatically defined ML pipeline. The programmatically defined workflow structure of an ML process can comprise the programmatically defined ML pipeline 120 illustrated in FIG. 1. In at least one embodiment, the ML pipeline comprises computer-executable instructions. These computer-executable instructions can comprise computer code. In at least one embodiment, the computer code is Python computer code. The ML operation can obtain data to be used to train an ML model, train the ML model using the data, and deploy the ML model to perform inferencing. In at least one embodiment, the ML operation comprises one or more of the pipeline operations associated with the pipeline workflow 104 illustrated in FIG. 1.

At 1204, the programmatically defined workflow structure is processed to generate a textualized workflow structure corresponding to the programmatically defined workflow structure. In at least one embodiment, programmatically defined workflow structure is processed to generate a human-readable format (i.e., textualized) of a ML pipeline. In at least one embodiment, the human-readable format of the ML pipeline is processed according to a second programming syntax that is different than the first programming syntax. In at least one embodiment, the human-readable format of the ML pipeline is a JSON representation of the programmatically defined ML pipeline. In at least one embodiment, the human-readable format of the ML pipeline comprises the human-readable ML pipeline 118 illustrated in FIG. 1. In at least one embodiment, the textualized workflow structure comprises a visual representation of the programmatically defined workflow structure. In at least one embodiment, the visual representation is generated from the human-readable format of the ML pipeline. In at least one embodiment, the visual representation comprises the visual representation of the human-readable ML pipeline 128 illustrated in FIG. 1.

At 1206, the at least one ML operation is caused to be executed according to the textualized workflow structure. In at least one embodiment, the operation is associated with one or more of the operations of the pipeline workflow 104 illustrated in FIG. 1.

Figure 13:
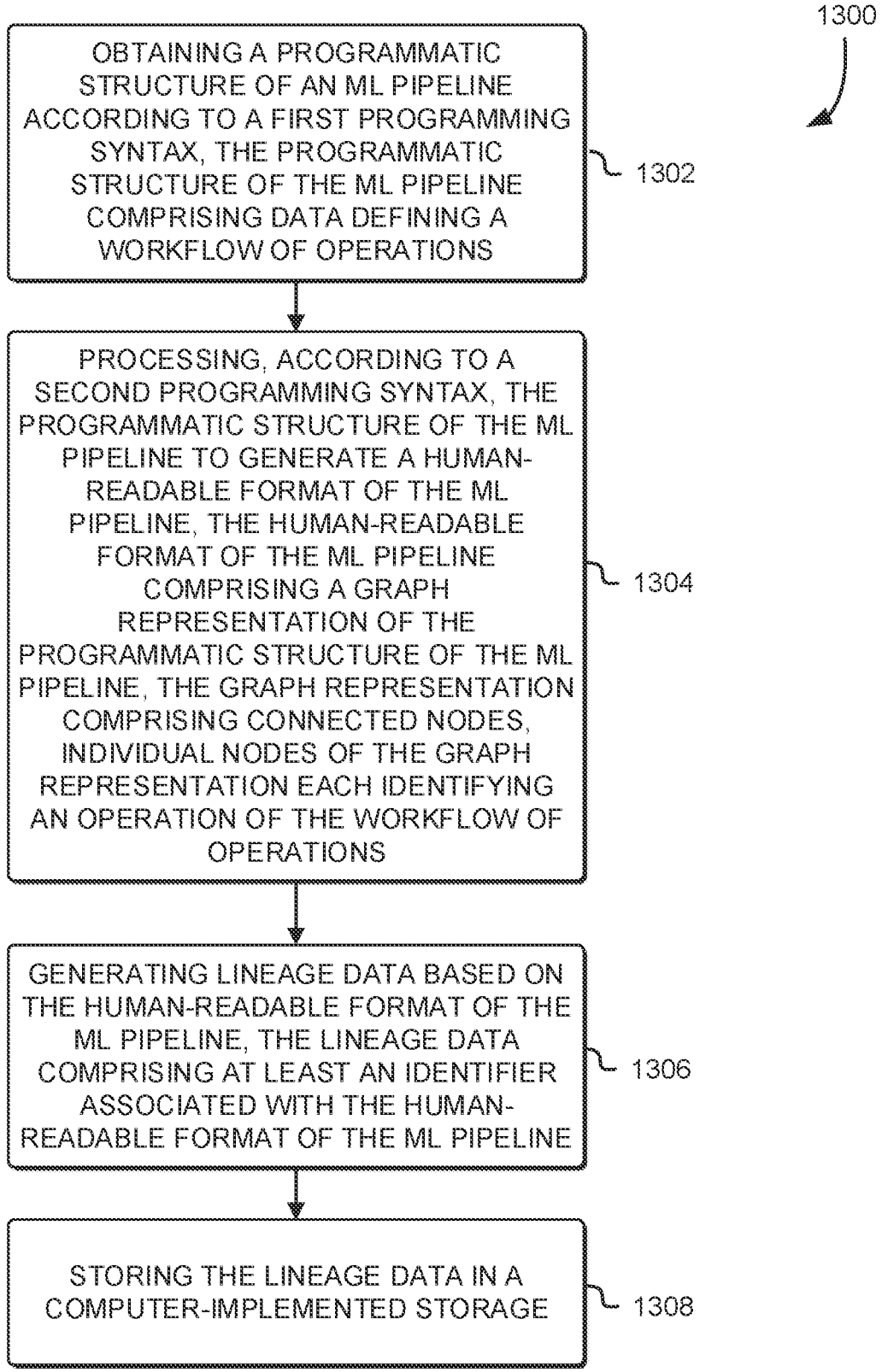
FIG. 13 illustrates a flow diagram including various processing acts, implemented by a system environment with one or more computing devices or nodes, which provide for generating ML pipelines and generating historical and/or lineage data associated with deploying and using ML models generated based on the ML pipelines, in accordance with at least one embodiment.

FIG. 13 illustrates a flow diagram 1300 including various processing acts, implemented by a system environment with one or more computing devices or nodes, which provide for generating ML pipelines and generating historical and/or lineage data associated with deploying and using ML models generated based on the ML pipelines, in accordance with at least one embodiment. In some implementations, the acts of the flow diagram 1300 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1300 to provide ML operations expressed programmatically and/or visually and generate lineage and/or historical data.

At 1302, a programmatic structure of an ML pipeline according to a first programming syntax is obtained. In at least one embodiment, the programmatic structure of the ML pipeline can include data defining a workflow of operations. The workflow of operations can obtain data to be used to train an ML model, train the ML model using the data, and deploy the ML model to perform inferencing. In at least one embodiment, the workflow of operations comprise one or more of the pipeline operations associated with the pipeline workflow 104 illustrated in FIG. 1. In an example, the programmatic structure of the ML pipeline can comprise the programmatically defined ML pipeline 120 generated from the pipeline workflow 104.

At 1304, the programmatic structure of the ML pipeline is processed to generate a human-readable format of the ML pipeline. In at least one embodiment, the human-readable format of the ML pipeline is processed according to a second programming syntax that is different than the first programming syntax. In at least one embodiment, the human-readable format of the ML pipeline is a JSON representation of the programmatically defined ML pipeline at 1002. In at least one embodiment, the human-readable format of the ML pipeline comprises the human-readable ML pipeline 118 illustrated in FIG. 1. In at least one embodiment, the human-readable format of the ML pipeline is generated as a graph representation of the programmatic structure of the ML pipeline. In at least one embodiment, the graph representation is based on the human-readable format of the ML pipeline. In at least one embodiment, the graph representation comprises one or more nodes. The one or more nodes can correspond to at least one ML operation defined programmatically by the programmatic structure of the ML pipeline. The graph representation can be a DAG, and the one or more nodes of the graph representation can be vertices of the DAG. In at least one embodiment, the human-readable format of the ML pipeline comprises the human-readable ML pipeline 118. In at least one embodiment, the graph representation of the programmatic structure of the ML pipeline comprises the visual representation of the human-readable ML pipeline 128 and/or the human-readable ML pipeline 900 represented visually in FIG. 9.

At 1306, lineage data can be generated. In at least one embodiment, the lineage data is based on the human-readable format of the ML pipeline. The lineage data can comprise at least an identifier of the human-readable format of the ML pipeline. In at least one embodiment, the identifier is a unique value assigned to the human-readable format of the ML pipeline. In at least one embodiment, the unique value is a hash value calculated and assigned to the human-readable format of the ML pipeline. The lineage data can be generated to include identifying information for the programmatic structure of the ML pipeline. For example, the lineage data can identify a version of the programmatic structure of the ML pipeline. The version can be expressed as a value. In another example, the lineage data can identify a version of the human-readable format of the ML pipeline. In at least one embodiment, the lineage data can include identifying information associated with one or more dataset used to train an ML model to be generated based on the human-readable format of the ML pipeline and/or the programmatic structure of the ML pipeline. In an embodiment, the lineage data can also comprise identifying information of an endpoint that is to use a deployed ML model based on a trained ML model according to the ML pipeline. Other data can also be included in the lineage data. In an embodiment, the lineage data can identify one or more users that created the ML pipeline, used the ML pipeline, executed the ML pipeline, deployed one or more ML models associated with the ML pipeline and/or deployed one or more versions of the ML pipeline, and so forth.

At 1308, the lineage data can be stored in a computer-implemented storage. In at least one embodiment, the lineage data can be stored in a database associated with the computer-implemented storage. The lineage data can be searched, via the database, to determine temporal information associated with ML pipelines, such as when those ML pipelines were created and/or modified, the lineage data can be searched, via the database, to determine one or more users that created and/or used the ML pipelines, that modified the ML pipelines, that deployed ML models generated based on the ML pipelines, and so forth.

Figure 14:
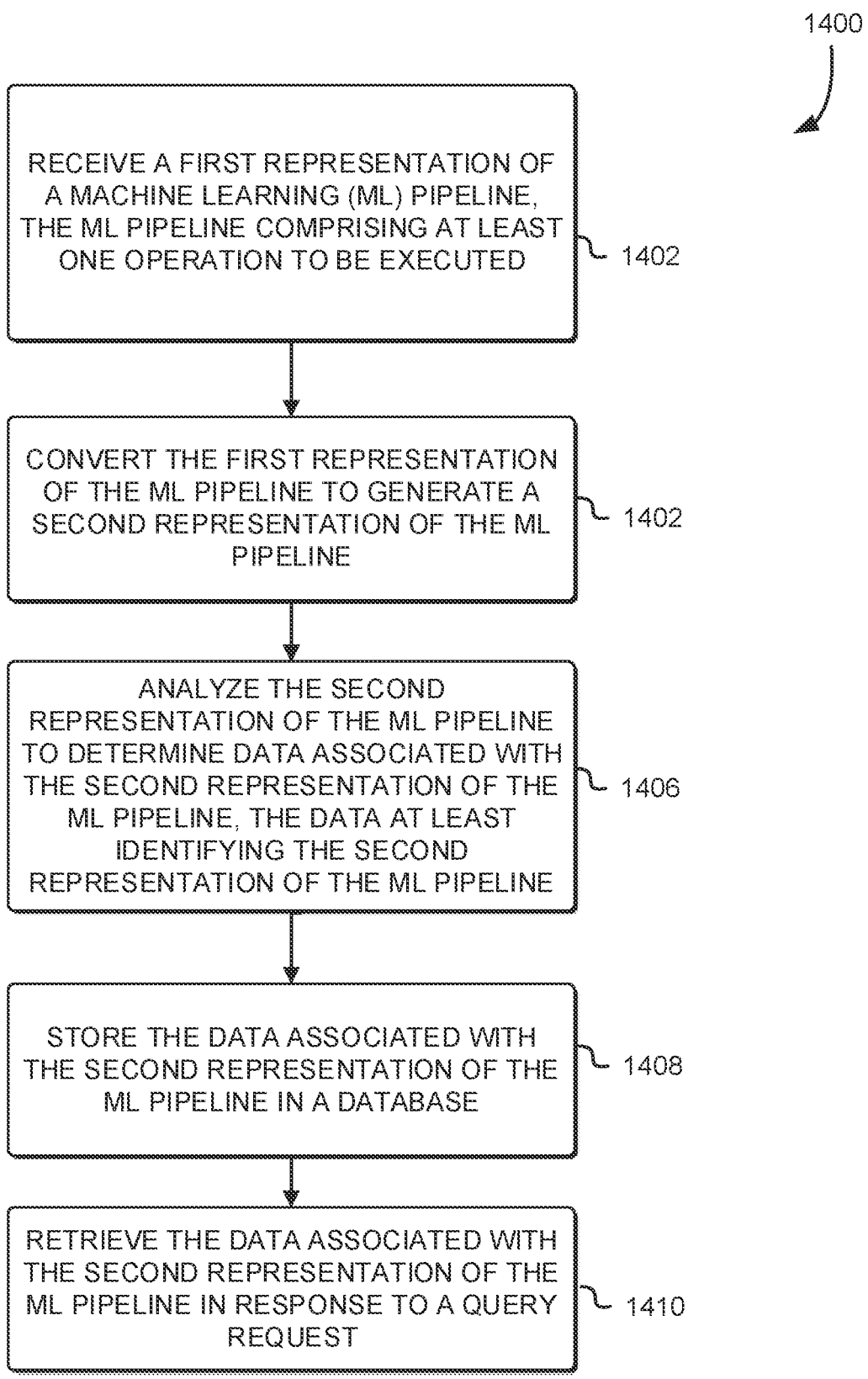
FIG. 14 illustrates a flow diagram including various processing acts, implemented by a system environment with one or more computing devices or nodes, which provide for generating ML pipelines and generating historical and/or lineage data associated with deploying and using ML models generated based on the ML pipelines, in accordance with at least one embodiment.

FIG. 14 illustrates a flow diagram 1400 including various processing acts, implemented by a system environment with one or more computing devices or nodes, which provide for generating ML pipelines and generating historical and/or lineage data associated with deploying and using ML models generated based on the ML pipelines, in accordance with at least one embodiment. In some implementations, the acts of the flow diagram 1400 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1400 to provide ML operations expressed programmatically and/or visually and generate lineage and/or historical data.

At 1402, a first representation of an ML pipeline is received. In an embodiment, the ML pipeline includes at least one operation to be executed. The ML pipeline can be a programmatically defined ML pipeline. The programmatically defined ML pipeline can comprise the programmatically defined ML pipeline 120 illustrated in FIG. 1. In at least one embodiment, the ML pipeline comprises computer-executable instructions. These computer-executable instructions can comprise computer code. In at least one embodiment, the computer code is Python computer code.

At 1404, the first representation of the ML pipeline is converted to generate a second representation of the ML pipeline. In at least one embodiment, the second representation of the ML pipeline is in human-readable format. For example, the human-readable format can be in JSON format, or other similar data centric syntax. In at least one embodiment, the second representation of the ML pipeline comprises at least the human-readable ML pipeline 118 illustrated in FIG. 1.

At 1406, the second representation of the ML pipeline is analyzed to determine data associated with the second representation of the ML pipeline. In at least one embodiment, the data at least identifies the second representation of the ML pipeline. In at least one embodiment, the data is lineage or historical data associated with the second representation of the ML pipeline. In at least one embodiment, the lineage data is based on the human-readable format of the ML pipeline. The lineage data can comprise at least an identifier of the second representation of the ML pipeline. In at least one embodiment, the identifier is a unique value assigned to the second representation of the ML pipeline. In at least one embodiment, the unique value is a hash value calculated and assigned to the second representation of the ML pipeline. The lineage data can be generated to include identifying information for the programmatic structure of the ML pipeline. For example, the lineage data can identify a version of the programmatic structure of the ML pipeline. The version can be expressed as a value. In another example, the lineage data can identify a version of the second representation of the ML pipeline. In at least one embodiment, the lineage data can include identifying information associated with one or more dataset used to train an ML model to be generated based on the second representation of the ML pipeline and/or the programmatic structure of the ML pipeline. In an embodiment, the lineage data can also comprise identifying information of an endpoint that is to use a deployed ML model based on a trained ML model according to the ML pipeline. Other data can also be included in the lineage data. In an embodiment, the lineage data can identify one or more users that created the ML pipeline, used the ML pipeline, executed the ML pipeline, deployed one or more ML models associated with the ML pipeline and/or deployed one or more versions of the ML pipeline, and so forth.

At 1408, the data associated with the second representation of the ML pipeline is stored in a database. The data can be searched, via the database, to determine temporal information associated with ML pipelines, such as when those ML pipelines were created and/or modified, the lineage data can be searched, via the database, to determine one or more users that created and/or used the ML pipelines, that modified the ML pipelines, that deployed ML models generated based on the ML pipelines, and so forth. In at least one embodiment, the data can be searched, via the database, to identify the second representation of the ML pipeline.

At 1410, the data associated with the second representation of the ML pipeline is retrieved in response to a query request. In at least one embodiment, the query request is generated by one or more users of an online service provider hosting the data associated with the second representation of the ML pipeline. In at least one embodiment, the query request seeks to identify a user that generated the second representation of the ML pipeline and/or the user that generated the first representation of the ML pipeline. In at least one embodiment, the query request seeks to identify when the second representation of the ML pipeline and/or the first representation of the ML pipeline were created and/or modified. Other query requests can be processed based on lineage data stored in the database. For example, the lineage data can comprise data associated with the second representation of the ML pipeline. In at least one embodiment, the lineage data is based on the human-readable format of the ML pipeline. The lineage data can comprise at least an identifier of the second representation of the ML pipeline. In at least one embodiment, the identifier is a unique value assigned to the second representation of the ML pipeline. In at least one embodiment, the unique value is a hash value calculated and assigned to the second representation of the ML pipeline. The lineage data can be generated to include identifying information for the programmatic structure of the ML pipeline. For example, the lineage data can identify a version of the programmatic structure of the ML pipeline. The version can be expressed as a value. In another example, the lineage data can identify a version of the second representation of the ML pipeline. In at least one embodiment, the lineage data can include identifying information associated with one or more dataset used to train an ML model to be generated based on the second representation of the ML pipeline and/or the programmatic structure of the ML pipeline. In an embodiment, the lineage data can also comprise identifying information of an endpoint that is to use a deployed ML model based on a trained ML model according to the ML pipeline. Other data can also be included in the lineage data. In an embodiment, the lineage data can identify one or more users that created the ML pipeline, used the ML pipeline, executed the ML pipeline, deployed one or more ML models associated with the ML pipeline and/or deployed one or more versions of the ML pipeline, and so forth.

Figure 15:
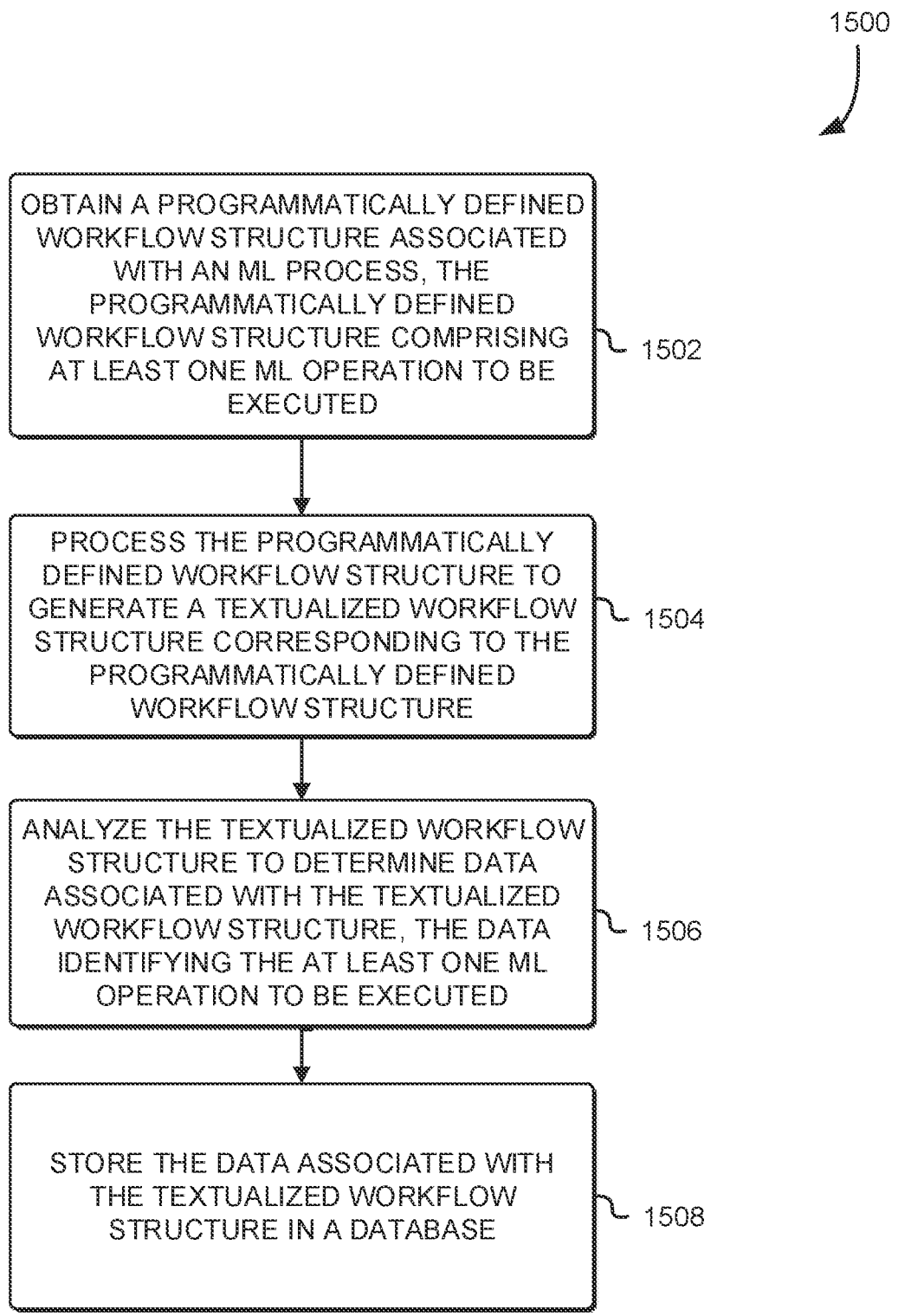
FIG. 15 illustrates a flow diagram including various processing acts, implemented by a system environment with one or more computing devices or nodes, which provide for generating ML pipelines and generating historical and/or lineage data associated with deploying and using ML models generated based on the ML pipelines, in accordance with at least one embodiment.

FIG. 15 illustrates a flow diagram 1500 including various processing acts, implemented by a system environment with one or more computing devices or nodes, which provide for generating ML pipelines and generating historical and/or lineage data associated with deploying and using ML models generated based on the ML pipelines, in accordance with at least one embodiment. In some implementations, the acts of the flow diagram 1500 are executed by one or more computing devices and elements and/or incorporate one or more of the operations describe and illustrated based on FIGS. 1-9 and 16. The illustrated computing devices may execute computer-executable instructions incorporating at least some of the processing acts of the flow diagram 1500 to provide ML operations expressed programmatically and/or visually and generate lineage and/or historical data.

At 1502, a programmatically defined workflow structure of an ML process is obtained. In at least one embodiment, the programmatically defined workflow structure can include at least one ML operation to be executed. The workflow structure can be a programmatically defined ML pipeline. The programmatically defined workflow structure of an ML process can comprise the programmatically defined ML pipeline 120 illustrated in FIG. 1. In at least one embodiment, the ML pipeline comprises computer-executable instructions. These computer-executable instructions can comprise computer code. In at least one embodiment, the computer code is Python computer code. The ML operation can obtain data to be used to train an ML model, train the ML model using the data, and deploy the ML model to perform inferencing. In at least one embodiment, the ML operation comprises one or more of the pipeline operations associated with the pipeline workflow 104 illustrated in FIG. 1.

At 1504, the programmatically defined workflow structure is processed to generate a textualized workflow structure corresponding to the programmatically defined workflow structure. In at least one embodiment, programmatically defined workflow structure is processed to generate a human-readable format (i.e., textualized) of a ML pipeline. In at least one embodiment, the human-readable format of the ML pipeline is processed according to a second programming syntax that is different than the first programming syntax. In at least one embodiment, the human-readable format of the ML pipeline is a JSON representation of the programmatically defined ML pipeline. In at least one embodiment, the human-readable format of the ML pipeline comprises the human-readable ML pipeline 118 illustrated in FIG. 1. In at least one embodiment, the textualized workflow structure comprises a visual representation of the programmatically defined workflow structure. In at least one embodiment, the visual representation is generated from the human-readable format of the ML pipeline. In at least one embodiment, the visual representation comprises the visual representation of the human-readable ML pipeline 128 illustrated in FIG. 1.

At 1506, the textualized workflow structure is analyzed to determine data associated with the textualized workflow structure. In at least one embodiment, the data at least identifies the textualized workflow structure. In at least one embodiment, the data is lineage or historical data associated with the textualized workflow structure. In at least one embodiment, the lineage data is based on textualized workflow structure. The lineage data can comprise at least an identifier of the textualized workflow structure. In at least one embodiment, the identifier is a unique value assigned to the textualized workflow structure. In at least one embodiment, the unique value is a hash value calculated and assigned to the textualized workflow structure. The lineage data can be generated to include identifying information for the programmatically defined workflow structure. For example, the lineage data can identify a version of the programmatically defined workflow structure. The version can be expressed as a value. In another example, the lineage data can identify a version of the textualized workflow structure. In at least one embodiment, the lineage data can include identifying information associated with one or more dataset used to train an ML model to be generated based on the textualized workflow structure and/or the programmatically defined workflow structure. In an embodiment, the lineage data can also comprise identifying information of an endpoint that is to use a deployed ML model based on a trained ML model according to the ML process. Other data can also be included in the lineage data. In an embodiment, the lineage data can identify one or more users that created the ML process, used the ML process, executed the ML process, deployed one or more ML models associated with the ML process and/or deployed one or more versions of the ML pipeline, and so forth.

At 1508, the data associated with the textualized workflow structure is stored in a database or other computer storage. The data can be searched, via the database, to determine temporal information associated with ML processes, such as when those ML processes were created and/or modified, the lineage data can be searched, via the database, to determine one or more users that created and/or used the ML processes, that modified the ML processes, that deployed ML models generated based on the ML processes, and so forth. In at least one embodiment, the data can be searched, via the database, to identify the second representation of the ML process.

In at least one embodiment, a query request is generated by one or more users of an online service provider hosting the data associated with the textualized workflow structure and/or the programmatically defined workflow structure associated with the ML process. In at least one embodiment, the query request seeks to identify a user that generated the textualized workflow structure and/or the programmatically defined workflow structure associated with the ML process. In at least one embodiment, the query request seeks to identify when the textualized workflow structure and/or the programmatically defined workflow structure associated with the ML process were created and/or modified. Other query requests can be processed based on lineage data stored in the database. For example, the lineage data can comprise data associated with the textualized workflow structure and/or the programmatically defined workflow structure associated with the ML process. In at least one embodiment, the lineage data is based on the textualized workflow structure and/or the programmatically defined workflow structure associated with the ML process. The lineage data can comprise at least an identifier of the textualized workflow structure and/or the programmatically defined workflow structure associated with the ML process. In at least one embodiment, the identifier is a unique value assigned to the textualized workflow structure and/or the programmatically defined workflow structure associated with the ML process. In at least one embodiment, the unique value is a hash value calculated and assigned to the textualized workflow structure and/or the programmatically defined workflow structure associated with the ML process. The lineage data can be generated to include identifying information for the textualized workflow structure and/or the programmatically defined workflow structure associated with the ML process. For example, the lineage data can identify a version of the programmatic structure of the ML pipeline. The version can be expressed as a value. In another example, the lineage data can identify a version of the textualized workflow structure and/or the programmatically defined workflow structure associated with the ML process. In at least one embodiment, the lineage data can include identifying information associated with one or more dataset used to train an ML model to be generated based on the textualized workflow structure and/or the programmatically defined workflow structure associated with the ML process. In an embodiment, the lineage data can also comprise identifying information of an endpoint that is to use a deployed ML model based on a trained ML model according to the ML process. Other data can also be included in the lineage data. In an embodiment, the lineage data can identify one or more users that created the ML process, used the ML process, executed the ML process, deployed one or more ML models associated with the ML process and/or deployed one or more versions of the ML process, and so forth.

Figure 16:
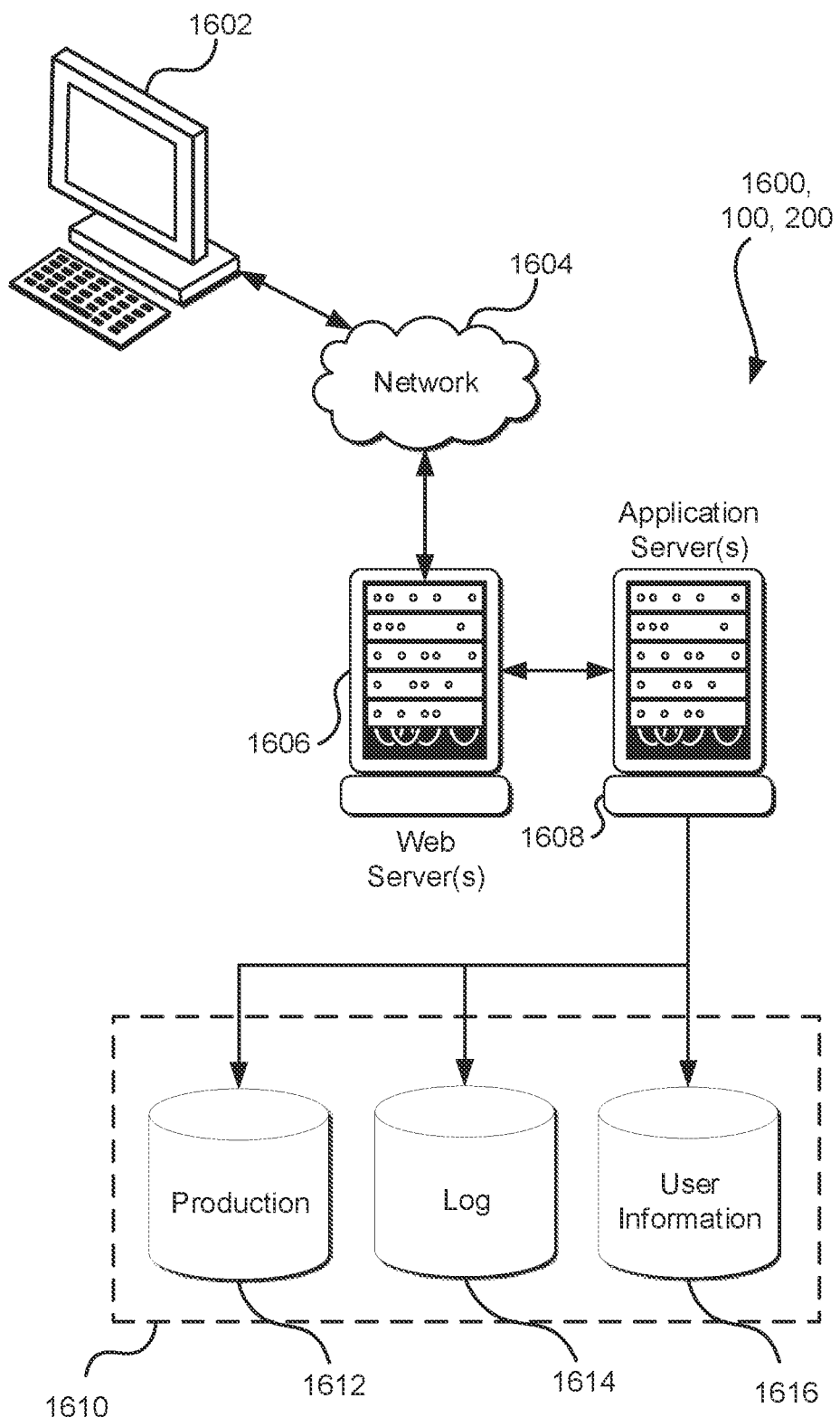
FIG. 16 illustrates a system in which various embodiments can be implemented.

FIG. 16 illustrates aspects of an example system 1600 for implementing aspects in accordance with an embodiment. As will be appreciated, although a web-based system is used for purposes of explanation, different systems may be used, as appropriate, to implement various embodiments. In an embodiment, the system includes an electronic client device 1602, which includes any appropriate device operable to send and/or receive requests, messages, or information over an appropriate network 1604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1606 for receiving requests and serving content in response thereto, although for other networks an alternative device serving a similar purpose could be used as would be apparent to one of ordinary skill in the art.

In an embodiment, the illustrative system includes at least one application server 1608 and a data store 1610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1602 and the application server 1608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1612 and user information 1616, which are used to serve content for the production side. The data store also is shown to include a mechanism for storing log data 1614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1610.

The data store 1610, in an embodiment, is operable, through logic associated therewith, to receive instructions from the application server 1608 and obtain, update or otherwise process data in response thereto, and the application server 1608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining a programmatic structure of a machine learning (ML) pipeline according to a first programming syntax, the programmatic structure of the ML pipeline comprising data defining a workflow of operations:
   obtain data to be used to train an ML model;
   train the ML model using the data; and
   deploy the ML model to perform inferencing;
   processing, according to a second programming syntax, the programmatic structure of the ML pipeline to generate a data interchange format of the ML pipeline, the data interchange format of the ML pipeline comprising a graph representation of the programmatic structure of the ML pipeline, the graph representation comprising at least one node representing at least one of the operations of the workflow, processing the programmatic structure of the ML pipeline including at least using a compiler that converts programing language code of the programmatic structure of the ML pipeline to generate the data interchange format of the ML pipeline; and
   causing one or more services to execute at least one of the operations of the workflow based on the data interchange format of the ML pipeline, execution of at least one of the operations triggering obtaining the data to be used to train the ML model, training the ML model using the data, or deploying the ML model to perform the inferencing.

2. The computer-implemented method according to claim 1, wherein the programmatic structure of the ML pipeline comprises computer code generated by a user based on the first programming syntax, and the operations of the workflow further comprise an operation to prepare the data to be used to train the ML model, preparing the data to be used to train the ML model to include at least performing a feature transformation on the data to insert data or remove data from the data to be used to train the ML model.

3. The computer-implemented method according to claim 1, wherein the graph representation is expressed as a directed acyclic graph (DAG) comprising a vertex that comprises the at least one node.

4. The computer-implemented method according to claim 1, wherein the workflow of operations further comprises an operation to register the ML model subsequent to deploying the ML model to perform the inferencing, registering the ML model to include storing data in a database, the data stored in the database comprising at least a name of the ML model, version information associated with the ML model, or date and time information corresponding to when the ML model was created or when the data was stored in the database.

5. A system, comprising:
one or more processors; and
memory that stores computer-executable instructions that are executable by the one or more processors to cause the system to:
receive a first representation of a machine learning (ML) pipeline, the ML pipeline comprising at least one operation to be executed;
convert the first representation of the ML pipeline to generate a second representation of the ML pipeline, converting the first representation of the ML pipeline including at least using a compiler that converts programing language code of the first representation of the ML pipeline to generate the second representation of the ML pipeline based on a data interchange format;
generate a visual representation based on the second representation of the ML pipeline, the visual representation comprising at least one node, the at least one node corresponding to the at least one operation to be executed; and
cause the at least one operation to be executed according to the second representation of the ML pipeline, the at least one operation to obtain data to be used to train an ML model, train the ML model, or deploy the ML model to perform inferencing.

6. The system according to claim 5, wherein the first representation of the ML pipeline comprises data based on a programming language.

7. The system according to claim 5, wherein the visual representation comprises a graph that includes a plurality of linked nodes, at least one of the linked nodes comprising the at least one node.

8. The system according to claim 5, wherein the ML pipeline comprises a first operation to be executed and a second operation to be executed, the first operation to process data to generate a training dataset and a validation dataset, and the second operation to train the ML model using the training dataset and the validation dataset.

9. The system according to claim 8, wherein the first operation is to process the data to generate a test dataset, and the ML pipeline further comprising a third operation to be executed, the third operation to evaluate the ML model trained using the training and validation datasets based on the test dataset.

10. The system according to claim 8, wherein the visual representation comprises a directed acyclic graph (DAG) comprising the at least one node, the at least one node associated with a vertex of the DAG and the vertex identifying the first operation or the second operation.

11. The system according to claim 5, wherein the at least one operation to be executed according to the ML pipeline is to cause the ML model determined from the ML pipeline to be registered in a database, registering the ML model in the database to comprise at least storing data in the database that identifies the ML model.

12. The system according to claim 5, wherein the visual representation comprises a graph to be displayed on a computing device comprising a display, the graph comprising the at least one node and the at least one node to comprise associated data determined from the at least one operation to be executed.

13. A non-transitory computer-readable storage medium storing thereon executable instructions that, as a result of being executed by one or more processors of a computer system, cause the computer system to:
obtain a programmatically defined workflow structure associated with a machine learning (ML) process, the programmatically defined workflow structure comprising at least one ML operation to be executed;
process the programmatically defined workflow structure to generate, based on a data interchange format, a textualized workflow structure corresponding to the programmatically defined workflow structure, processing the programmatically defined workflow structure to generate the textualized workflow structure including using a code compiler that converts programming language code of the programmatically defined workflow structure to generate the textualized workflow structure; and
cause the at least one ML operation to be executed according to the textualized workflow structure, the at least one ML operation to obtain data to be used to train an ML model, train the ML model, or deploy the ML model to perform inferencing.

14. The non-transitory computer-readable storage medium according to claim 13, wherein the textualized workflow structure comprises human-readable text.

15. The non-transitory computer-readable storage medium according to claim 13, wherein the programmatically defined workflow structure comprises a plurality of ML operations to be executed, the ML operations comprising an ML evaluation operation to evaluate a trained ML model and an ML model registration operation to register the trained ML model.

16. The non-transitory computer-readable storage medium according to claim 13, wherein the ML process comprises a first ML operation to be executed and a second ML operation to be executed, the first ML operation to process data to generate a training dataset and a validation dataset, and the second ML operation to train an ML model using the training dataset and the validation dataset.

17. The non-transitory computer-readable storage medium according to claim 16, wherein the first ML operation is to further process the data to generate a test dataset, and the ML process further comprising a third ML operation to be executed, the third ML operation to evaluate the ML model trained using the training and validation datasets based on the test dataset.

18. The non-transitory computer-readable storage medium according to claim 13, wherein the textualized workflow structure comprises a visual representation comprising at least one node corresponding to the at least one ML operation.

19. The non-transitory computer-readable storage medium according to claim 18, wherein the visual representation comprises a directed acyclic graph (DAG) that includes a vertex identifying the at least one ML operation.

20. The non-transitory computer-readable storage medium according claim 13, the programmatically defined workflow structure comprises a plurality of ML operations to be executed, the ML operations comprising an ML data processing operation to prepare data and an ML training operation to train an ML model based on the prepared data.

\* \* \* \* \*